US010789783B2

(12) United States Patent
Stansell et al.

(10) Patent No.: US 10,789,783 B2
(45) Date of Patent: Sep. 29, 2020

(54) CUSTOMIZED AUGMENTED REALITY ITEM FILTERING SYSTEM

(71) Applicants: Walmart Apollo, LLC, Bentonville, AR (US); L'OREAL, Paris (FR)

(72) Inventors: Ian Stansell, Bentonville, AR (US); Steven Lewis, Bentonville, AR (US); Scott Lewis, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/250,416

(22) Filed: Jan. 17, 2019

(65) Prior Publication Data

US 2019/0244436 A1 Aug. 8, 2019

Related U.S. Application Data

(60) Provisional application No. 62/627,072, filed on Feb. 6, 2018.

(51) Int. Cl.

| G06T 19/20 | (2011.01) |
| G06T 19/00 | (2011.01) |
| G06Q 30/06 | (2012.01) |
| G06F 3/0482 | (2013.01) |

(52) U.S. Cl.
CPC .......... *G06T 19/20* (2013.01); *G06F 3/0482* (2013.01); *G06Q 30/0631* (2013.01); *G06Q 30/0643* (2013.01); *G06T 19/006* (2013.01)

(58) Field of Classification Search
CPC ..... G06T 19/20; G06T 19/006; G06F 3/0482; G06Q 30/0631; G06Q 30/0643

USPC ........................................................ 345/633
See application file for complete search history.

(56) References Cited

U.S. PATENT DOCUMENTS

| 8,606,645 | B1 | 12/2013 | Applefeld |
| 8,866,847 | B2 | 10/2014 | Bedi et al. |
| 9,202,443 | B2 | 12/2015 | Perez et al. |
| 9,454,220 | B2 | 9/2016 | Devries |
| 10,303,133 | B1 * | 5/2019 | Dhalla ............. G05B 19/41865 |

(Continued)

OTHER PUBLICATIONS

Thomas, Shane, "Written Opinion", International Application No. PCT/US2019/013970, dated May 13, 2019, 8 pages.

(Continued)

*Primary Examiner* — Jin Ge

(57) ABSTRACT

Examples provide customized augmented reality item filtering. An item filter analyzes item data using selection criteria and user preferences to identify high-interest item(s) and/or low-interest item(s) within a field of view (FOV) of a user device associated with a user. A high-interest item can include an item physically present within a portion of an item selection area or an un-stocked item not physically present within the portion of the item selection area. An augmented reality (AR) generator creates an AR image including a real-world image of the portion of the item selection area overlaid with graphical elements, including positive item indicators associated with high-interest items, negative item indicators associated with low-interest items, and/or un-stocked virtual items. The AR image is updated in real-time in response to user input, promotional data associated with one or more filtered item(s), and/or changes associated with the items within the FOV of the user device.

20 Claims, 13 Drawing Sheets

(56) References Cited

U.S. PATENT DOCUMENTS

| | | | |
|---|---|---|---|
| 2002/0062245 A1 | 5/2002 | Niu et al. | |
| 2011/0275409 A1* | 11/2011 | Lee | G06F 1/1643 |
| | | | 455/556.1 |
| 2012/0166241 A1* | 6/2012 | Livingston | G06Q 10/0631 |
| | | | 705/7.12 |
| 2012/0327119 A1 | 12/2012 | Woo et al. | |
| 2013/0083003 A1 | 4/2013 | Perez et al. | |
| 2013/0286048 A1 | 10/2013 | Sternitzke | |
| 2015/0012394 A1 | 1/2015 | Rossi et al. | |
| 2015/0294385 A1 | 10/2015 | Grigg et al. | |
| 2016/0042315 A1 | 2/2016 | Field-Darragh et al. | |
| 2016/0196603 A1* | 7/2016 | Perez | G06K 9/00671 |
| | | | 345/633 |
| 2016/0330522 A1* | 11/2016 | Newell | G06F 21/604 |
| 2017/0039613 A1 | 2/2017 | Kaehler et al. | |
| 2017/0358141 A1* | 12/2017 | Stafford | G02B 27/017 |
| 2018/0231973 A1* | 8/2018 | Mattingly | G05D 1/0044 |
| 2018/0307303 A1* | 10/2018 | Powderly | G06F 3/011 |

OTHER PUBLICATIONS

Thomas, Shane, "International Search Report", International Application No. PCT/US2019/013970, dated May 13, 2019, 4 pages.

\* cited by examiner

CUSTOMIZED AUGMENTED REALITY ITEM FILTERING SYSTEM

BACKGROUND

Consumers typically prefer a large selection of items and options to choose from when shopping within an item selection area. Consumers are accustomed to selecting from a variety of brands, flavors, unit sizes, ingredients, price ranges, and other features. To locate a desired item or type of item, consumers typically browse items on shelves, reading labels, until the desired item or an acceptable substitute for the item is located. However, this can be a time-consuming and inefficient process that can also be frustrating or overwhelming due to the number items on the shelves and varieties of those items. Moreover, consumers may have difficulty identifying new items/unfamiliar items which would be of interest or acceptable substitutes for desired items due to a lack of information about the new/unfamiliar items.

SUMMARY

Some examples provide an augmented reality system for filtering items in real-time. The system includes a memory and at least one processor communicatively coupled to the memory. A filter component analyzes item data associated with a plurality of items within a field of view (FOV) of a user device associated with a user in an item selectin area. The item data is analyzed using a set of weighted selection criteria and a set of user preferences. The filter component selects a set of high-interest items and a set of low-interest items for the user based on the analysis. The set of high-interest items includes a set of items physically available within the FOV of the user device and a set of items physically absent from the FOV of the user device. An overlay component assigns a positive item indicator to each item in the set of high-interest items. The overlay component assigns a negative item indicator for each item in the set of low-interest items. An augmented reality (AR) generator outputs an AR display of the FOV of the user device. The AR display includes a real-world image of a portion of the item selection area within a FOV of the user and an AR overlay. The AR overlay includes a set of positive item indicators associated with each item in the set of high-interest items, a set of negative item indicators associated with each item in the set of low-interest items, and a virtual display comprising at least one un-stocked virtual item physically absent from the FOV of the user device.

Other examples provide a computer-implemented method for augmented reality item filtering. An analysis component identifies a location of a user device associated with a user and a plurality of items within a predetermined distance of the user device based on the identified location and a site-specific planogram. A filter component identifies a set of high-interest items and a set of low-interest items from the plurality of items within the predetermined distance of the user. A prediction component identifies a set of un-stocked items of potential interest to the user. Each item in the set of un-stocked items is physically absent from a set of displays within the FOV of the user. An overlay component assigns a positive item indicator to each item in a set of high-interest items, a negative item indicator for each item in the set of low-interest items, and a graphical representation for each item in the set of un-stocked items. An AR display generator generates an AR display of a portion of an item selection area within a FOV of the user. The AR display is sent to the user device for display to the user. The AR display includes a real-world image of a portion of the item selection area within the FOV of the user enhanced by an AR overlay. The AR overlay includes a set of positive item indicators associated with each item in the set of high-interest items, a set of negative item indicators for each item in the set of low-interest items, and a graphical representation of each item in the set of un-stocked items.

Still other examples provide a system for augmented reality item filtering. The system includes a memory; at least one processor communicatively coupled to the memory; and a set of sensors associated with a user device located within an item selection area. The set of sensors generate sensor data associated with a plurality of items within the item selection area. An analysis component analyzes the sensor data using item data and a planogram to identify a location of a user within the item selection area and identify a plurality of items within a predetermined distance of the user. A filter component analyzes the identified plurality of items using a set of selection criteria and user preferences. The filter component selects a high-interest category of items of potential interest to the user and a low-interest category of items within the predetermined distance of the user. An overlay component assigns a positive category indicator to each item in the selected high-interest category and a negative category indicator to each item in the selected low-interest category. An AR generator displays an AR display of the FOV to the user. The AR display includes a real-world image of a portion of the item selection area within a FOV of the user and an AR overlay enhancing the real-world image. The AR overlay includes a positive category indicator associated with each item in the selected high-interest category within the FOV. The AR overlay also includes a negative category indicator for each item in the selected low-interest category within the FOV. The AR generator updates the AR display in real-time to change an indicator associated with an identified item in the selected low-interest category from a negative category indicator to a positive category indicator on condition a promotional offer associated with the identified item is received from a set of suppliers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, examples of the disclosure customized filtering of items in an item selection area via augmented reality (AR). In some examples, a customized AR filter component generates an AR display including a real-world image of a plurality of items overlaid with graphical item indicators identifying items within a predetermined distance of the user predicted to be of high-interest to the user and/or items predicted to be of low-interest to the user. This enables the user to quickly and efficiently identify items which the user is interested in selecting while greying out/hiding items the user is uninterested in viewing to save time and reduce/eliminate any frustration which can occur due to viewing items of little/no interest to the user.

The customized AR filter component in other examples generates an AR display of a portion of a real-world item selection area overlaid with one or more graphical elements representing un-stocked items predicted to be of interest to the user which are not physically present within the item selection area. The un-stocked items physically absent from the item selection area can include items located in another part of a store (not within the user's immediate vicinity), items in a backroom or other storage area, items in transit to the store, items available for order from a distribution center, items available for order from another store/storage area, etc. This enables the user to select a desired item from the selection of items currently available in the item selection area as well as items not physically present but available for order. This enables provision of a greater selection of items, increased options available for users and increased likelihood that a user will locate a desired item or substitute for an item the user is interested in obtaining.

Figure 1:
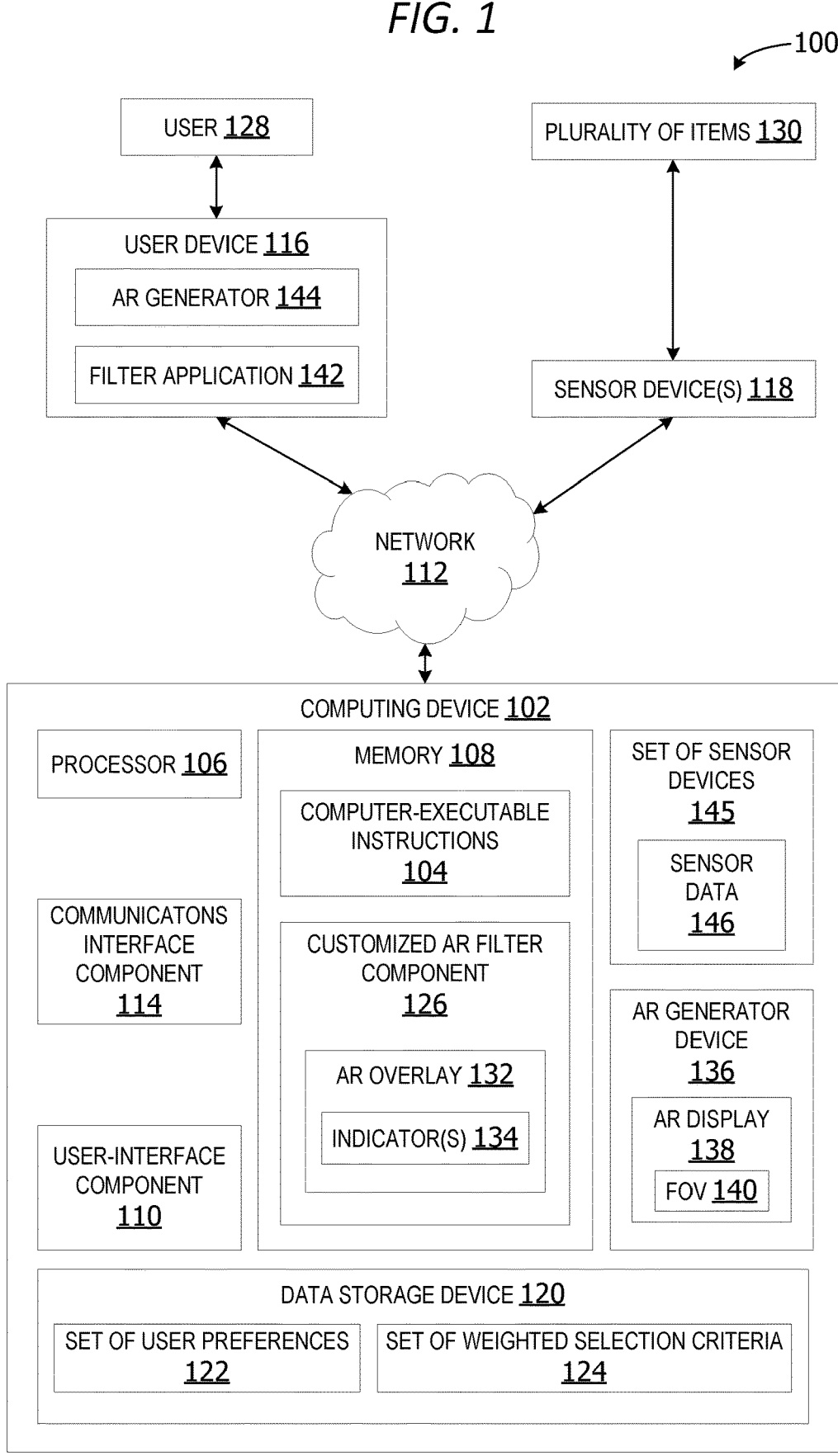
FIG. 1 is an exemplary block diagram illustrating a system for customized item filtering using augmented reality (AR).

Referring again to FIG. 1, an exemplary block diagram illustrates a system 100 for customized item filtering using augmented reality (AR). In the example of FIG. 1, the computing device 102 represents any device executing computer-executable instructions 104 (e.g., as application programs, operating system functionality, or both) to implement the operations and functionality associated with the computing device 102. The computing device 102 can include a mobile computing device or any other portable device. In some examples, the mobile computing device includes a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106 and a memory 108. The computing device 102 in other examples includes a user interface component 110.

The processor 106 includes any quantity of processing units and is programmed to execute the computer-executable instructions 104. The computer-executable instructions 104 can be performed by the processor 106 or by multiple processors within the computing device 102 or performed by a processor external to the computing device 102. In some examples, the processor 106 is programmed to execute instructions such as those illustrated in the figures (e.g., FIG. 13, FIG. 14, FIG. 15, and FIG. 16).

The computing device 102 further has one or more computer readable media such as the memory 108. The memory 108 includes any quantity of media associated with or accessible by the computing device 102. The memory 108 can be internal to the computing device 102 (as shown in FIG. 1), external to the computing device (not shown), or both (not shown). In some examples, the memory 108 includes read-only memory and/or memory wired into an analog computing device.

The memory 108 stores data, such as one or more applications. The applications, when executed by the processor 106, operate to perform functionality on the computing device 102. The applications can communicate with counterpart applications or services such as web services accessible via a network 112. In an example, the applications represent downloaded client-side applications that correspond to server-side services executing in a cloud.

In other examples, the user interface component 110 includes a graphics card for displaying data to the user and receiving data from the user. The user interface component 110 can also include computer-executable instructions (e.g., a driver) for operating the graphics card. Further, the user interface component 110 can include a display (e.g., a touch screen display or natural user interface) and/or computer-executable instructions (e.g., a driver) for operating the display. The user interface component 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In an example, the user inputs commands or manipulate data by moving the computing device 102 in a particular way.

The network 112 is implemented by one or more physical network components, such as, but without limitation, routers, switches, network interface cards (NICs), and other network devices. The network 112 is any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface component 114. The communications interface component 114 includes a network interface card and/or computer-executable instructions (e.g., a driver) for operating the network interface card. Communication between the computing device 102 and other devices, such as but not limited to, the user device 116 and/or one or more sensor device(s) 118, can occur using any protocol or mechanism over any wired or wireless connection. In some examples, the communications interface component 114 is operable with short range communication technologies such as by using near-field communication (NFC) tags.

The user device 116 represents any device executing computer-executable instructions. The user device 116 can be implemented as a mobile computing device, such as, but not limited to, a wearable computing device, a mobile telephone, laptop, tablet, computing pad, netbook, gaming device, and/or any other portable device. The user device 116 includes at least one processor and a memory. The user device 116 can also include a user interface component. In this example, the user device 116 is an AR headset.

The set of sensor device(s) 118 is a set of one or more devices for generating sensor data 146 associated with the plurality of items 130. The set of sensor device(s) 118 can include, without limitation, one or more image capture devices, microphones, radio frequency identifier (RFID) tag reader(s), barcode readers, robotic sensor devices, etc. An image capture device can include a video camera and/or a still image camera for generating an image of at least one item in the plurality of items 130. A barcode reader can include a universal product code (UPC) reader, matrix barcode reader, quick response (QR) code reader, etc.

The system 100 optionally includes a data storage device 120 for storing data, such as, but not limited to a set of user preferences 122 and/or a set of weighted selection criteria 124. The set of weighted selection criteria 124 includes one or more filtering rules for filtering high-interest items and low-interest items from the plurality of items. The weighted selection criteria 124 can include positive filtering rules and negative filtering rules. Positive filtering rules are properties or categories for high-interest items. The negative filtering rules include properties/categories for low-interest items.

The weighted selection criteria 124 in some examples include positive or negative attributes for filtering items. A positive attribute is an attribute of an item that the user wants/desires. A negative attribute for filtering is an attribute of an item that is undesirable/unwanted by the user.

The attributes can include ingredients, product dimensions, descriptions, price, supplier, manufacturer, type of packaging, aisle location, UPC, origin, etc. Items can be filtered to select items made using recycled materials, item that are aluminum free, items containing no high-fructose corn syrup (HFCS), sugar-free, gluten free, or other attribute.

In one example, the system 100 filters items to highlight/select items conforming to a vegan diet. In this example, positive attributes for filtering include, without limitation, items having no animal products. The negative attributes for filtering can include, without limitation, animal products in the ingredients or composition of the item.

In other examples, a negative attribute for filtering (negative filter) includes an ingredient that is harmful to the user or unwanted by the user, such as an allergen. For example, the user can have a negative filter criterion for peanuts. In this example, all items having peanuts in the ingredients are filtered out. In another example, the selection criteria can indicate that only gluten-free items are selected, and gluten-containing items are filtered out.

In another example, the system identifies each instance of each type of item in accordance with a unique identifier, such as a UPC or RFID tag. Each instance of each type of item that is perishable can have its own expiration date. In these examples, the selection criteria includes an expiration date or range of expiration dates. The system 100 in these examples filter items in accordance with a user selected expiration date and/or a user selected range of expiration dates. This enables a user, such as a stocking manager, to identify items which are approaching an expiration date for markdown, removal from shelves for disposal of the item, and/or relocation of the item to a markdown area.

The weighted selection criteria 124 in another example specifies the number of filter results to be included in the final results, such as the number of high-interest items to be identified. If the weighted selection criteria 124 specifies ten filter results, the final set of high-interest items identified by the AR filter application will include ten or less items matching the selection criteria and/or the user-provided search terms. In another example, if the weighted selection criteria 124 specifies twenty results, the AR display will include twenty or fewer items within the AR display having positive item indicators. All other items not included in the twenty filter results will be obscured, greyed out, hidden or otherwise associated with a negative item indicator. This enables users to limit the search results to reduce resource usage on the user device.

The data storage device 120 can include one or more different types of data storage devices, such as, for example, one or more rotating disks drives, one or more solid state drives (SSDs), and/or any other type of data storage device. The data storage device 120 in some non-limiting examples includes a redundant array of independent disks (RAID) array. In other examples, the data storage device 120 includes a database.

The data storage device 120 in this example is included within the computing device 102 or associated with the computing device 102. In other examples, the data storage device 120 is a remote data storage accessed by the computing device via the network 112, such as a remote data storage device, a data storage in a remote data center, or a cloud storage.

The data storage device 120 in some non-limiting examples is utilized to aggregate data together for item filtering. The aggregated data can include item data, planogram data, aisle location data, promotional data, selection criteria, user preference data, transaction history data, etc. This enables data utilized for item selection to be aggregated into a single location for quick and efficient access by the item filter and/or the filter application on the user device.

In another example, the data storage device 120 stores inventory data, including inventory of items within the item selection area. In other examples, the data is aggregated on a cloud storage device rather than a physical data storage associated with the item selection area.

The memory 108 in some examples stores one or more computer-executable components. Exemplary components include a customized AR filter component 126. The customized AR filter component 126, identifies a location of the user device 116 associated with a user 128 and a plurality of items 130 within a predetermined distance of the user device 116 based on the identified location of the user device 116.

In some examples, the AR filter component 126 identifies the location of the user device 116 by analyzes sensor data generated by the user device 116 and sent to the customized AR filter component 126 on the computing device 102 via the network 112. The sensor data received from the user device 116 can include images/video of items within a predetermined range of the user device 116, scanner data obtained by scanning items in the plurality of items 130, and/or any other sensor data.

The customized AR filter component 126 identifies high-interest items and/or low-interest items from the plurality of items 130 by filtering items in the plurality of items 130 within the predetermined range of the user. The predetermined range of the user in an example is the area or range encompassing the FOV of the user device. An item of high-interest is an item conforming with one or more filter criteria/search terms or item attributes provided by the user. A low-interest item is an item that does not conform/match desired attributes/filter criteria provided by the user. The customized AR filter component 126 receives the user-provided search terms/filter criteria from the user device 116 via the network 112. In an example, the filter application includes security credentials enabling it to access the network 112. The user device 116 credentials can be authorized via a user login, or other credentials.

The customized AR filter component 126 in some examples identifies one or more un-stocked items of high-interest to the user. An un-stocked item is an item that conforms to the user's desired attributes/search criteria but is not physically available within the plurality of items 130. An un-stocked item can include items available in another part of a store, items available on request from a backroom or other storage area, and/or items available for order from another store, a distribution center or other remote location. This enables the item filtering system to be linked to online/e-commerce item fulfillment resources.

The customized AR filter component 126 generates an AR overlay 132 including one or more indictor(s) 134. The indictor(s) 134 include positive item indicator(s) associated with each high-interest item in the plurality of items 130, negative item indicator(s) associated with each low-interest item in the plurality of items 130, and/or a graphical representation for each un-stocked item of potential interest to the user 128.

An AR generator device 136 outputs an AR display 138 of a portion of an item selection area within a field of view (FOV) 140 of the user 128, including the plurality of items 130. The AR display 138 is a three-dimensional image including real-world elements as well as virtual/graphical elements generated by the AR generator device 136. The AR display 138 includes the AR overlay 132 superimposed over the real-world image of the items in the FOV of the user 128.

In other examples, the computing device 102 sends the AR overlay 132 to the user device 116 via the network 112. A filter application 142 generates the AR display 138. The AR overlay includes an identification of filtered items (high-interest and low-interest items. An AR generator 144 on the user device utilizes the AR overlay received from the computing device to generate the AR display 138 and output the AR display 138 to the user 128. The user device 116 downloads the filter application 142 from a web applications server via the network 112.

The computing device 102 optionally performs the item filtering and generate filter data identifying high-interest items and/or low-interest items for a selected user. The filter data, identifying low-interest and/or high-interest items, are sent to the user device 116 via the network 112. The filter application 142 generates the AR display 138, including the AR overlay providing positive item indicators and negative item indicators based on the filter data received from the computing device 102. An AR generator 144 outputs the AR display 138 to the user 128.

In still other examples, the customized AR filter component 126 is executed on the user device 116. In these examples, the customized AR filer component identifies the location of the user device 116, filters items using selection criteria, generates the AR display 138 via three-dimensional mapping, and outputs the AR display 138 to the user 128 in real-time as the user views the plurality of items 130.

The AR display 138 is updated at predetermined time intervals in other examples. The AR display 138 in a non-limiting example, is updated every three seconds. In another example, the AR display 138 is updated every five seconds. In other examples, the AR display 138 is updated in response to user input.

The user input in one example includes, without limitation, a verbal request for information associated with an item, a user gesturing towards an item, a user touching or picking up a physical item within the FOV of the user device, a user placing a physical item in a physical basket/cart, a user touching or selecting an un-stocked virtual item on a virtual shelf/display within the AR display, a user selecting a control associated with an item within the AR display, a user changing an item arrangement or shelf/display arrangement within the AR display, and/or any other user input. In other examples, the user input includes user behavior or movements, such as a hand gesture, pointing, toughing an item, removing an item from a shelf, clicking on an item, etc. The user input can include typing or speaking search terms or other queries/requests.

The user device 116 in some examples communicates with the computing device 102 or other local server on the Internet via web services application programming interface (API) management. The user device 116 provides real-time AR capability to filter items based on customized criteria based on the user's preferences and prior transaction history as the user walk's around a store shopping. The system 100 highlights items of interest to the user and/or blocks or obscures unwanted items based on the filtering criteria and/or user-provided search terms or item attributes desired by the user.

In one example, if the user associated with the user device 116 is searching for a skin care product but the user does not know exactly which skin care item would be most suitable for the user, the user device 116 filters the items in the plurality of items 130 to identify one or more items having the desired attributes and matching user preferences to facilitate location of an appropriate item in less time for improved user satisfaction. The attributes/filter criteria enable the user to narrow down the search. In the example above, the user indicates desired attributes such as, but not limited to, items designed for use at night, moisturizer, non-comedogenic, cream or liquid, items within a specified price-range, etc. The system 100 identifies items conforming to the specified attributes, preferences, etc.

In an example, the user specifies search/filter criteria such as, but not limited to, fishing lures for catching big mouth bass. In this example, the system 100 identifies fishing lure items designed for catching big mouth bass. Fishing lures which are not appropriate for catching big mouth bass would be placed in the set of low-interest items and filtered out/associated with a negative item indicator for hiding/obscuring the items.

In another example, the user device 116 utilizes planogram data, aisle location data, sensor data (image data), item data, and selection criteria to generate the AR display. The user device 116 obtains the planogram data, aisle location data, item data, and/or other AR filtering data from the computing device, a data storage device, or other data source via a request accompanied by the appropriate security credentials sent via the network 112. The request can include an identification of a store (item selection area identifier) to ensure the planogram, aisle location data, and item data is store-specific.

The computing device 102 optionally includes a set of sensor devices 145 for generating sensor data 146. The set of sensor devices 145 includes one or more image capture devices, one or more scanner devices, a robotic scanner device, one or more RFID tag readers, or any other type of sensor device. The set of sensor devices 145 generate sensor data 146 such as, but not limited to, image data associated with one or more items in the plurality of items 130. The computing device 102 optionally analyzes the sensor data 146 using image recognition and item data to determine a location of the user 128 and/or identify items in the plurality of items 130.

The computing device 102 performs the image analysis/image recognition and item filtering. The user device 116 includes AR (overlay and interpretation) and computer vision for understanding and context mapping of the area/location awareness recognition. The user device 116 generates the AR overlay and AR display utilizes the item filtering results identifying high-interest items and low-interest items to generate the AR display on the user device 116.

In other examples, the computing device 102 receives the sensor data from the user device 116 and generates the instructions for creating the AR display. The computing device 102 outputs the instructions to the user device 116.

Figure 2:
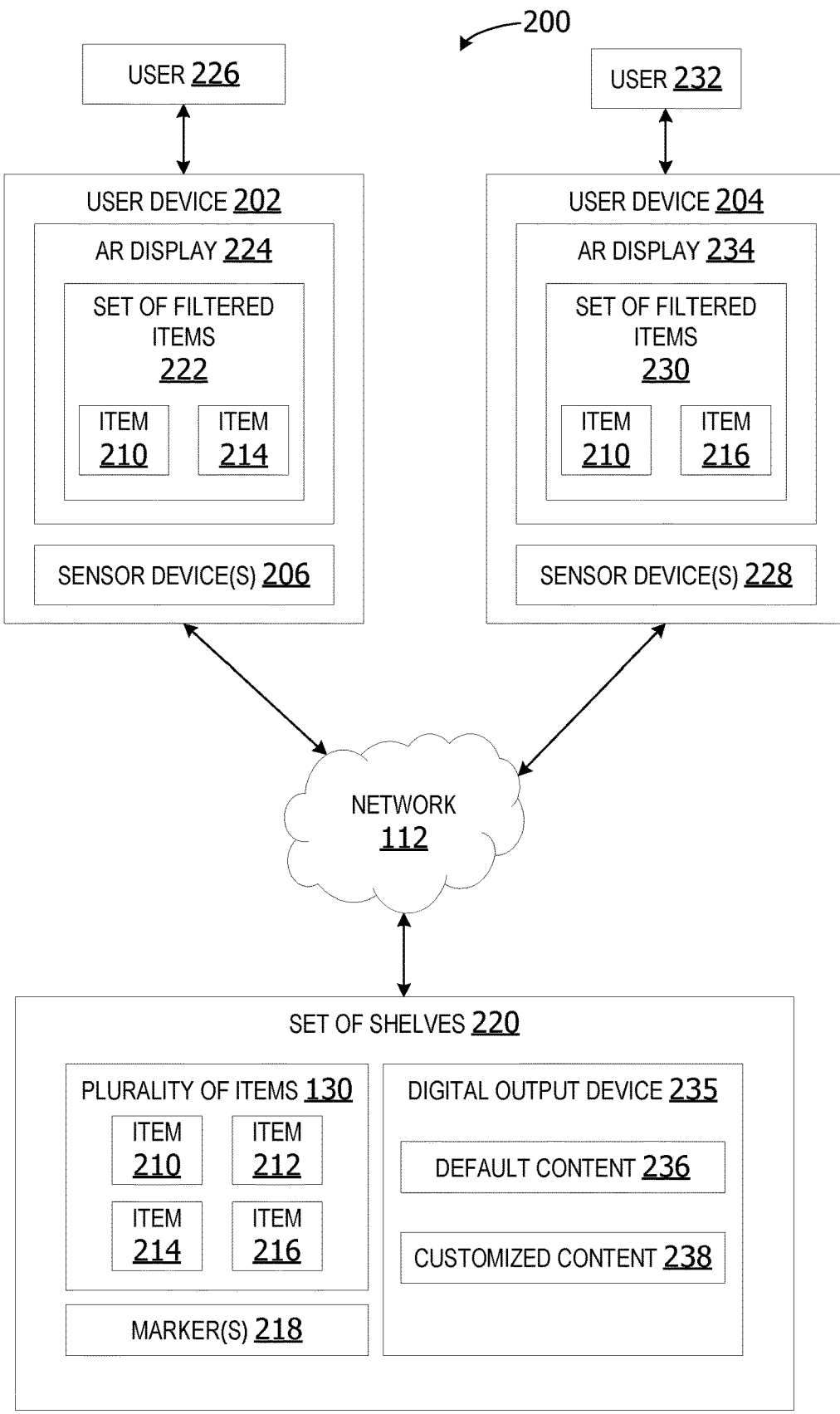
FIG. 2 is an exemplary block diagram illustrating a system for per-user customized filtering of items via a user device.

FIG. 2 is an exemplary block diagram illustrating a system 100 for per-user customized filtering of items via a user device, such as the user device 202 or the user device 204. Sensor device(s) 206 generates sensor data associated with a plurality of items 130. The sensor data can include image data (camera images) of the item, the set of shelves 220, marker(s) 218 on the items, marker(s) 218 on the set of shelves, or any other identifying marks within the item selection area.

The plurality of items 130 includes items arranged on one or more shelves in the set of shelves 220, such as, but not limited to, item 210, item 212, item 214, and/or item 216. The plurality of items 130 can include one or more marker(s) 218 used to identify the items and/or identify a location of the user device 202 and/or the user device 204.

The marker(s) 218 includes one or more markers associated with one or more items in the plurality of items 130. The marker(s) 218 can include a UPC, matrix barcode, printed "text" label, symbol, RFID tag, watermark, graphic, a sign, a QR code, or any other mark for identifying an item or a shelf in the set of shelves. A marker can be included on a paper label, sticker, paint, engraving, etc. The system analyzes sensor data associated with the marker(s) 218 with item data, planogram, and/or aisle location data to identify one or more items within a FOV or other range of the user or user device.

In one example, different clothing sizes are assigned a same UPC code but have a different color tag. In a non-limiting example, large size clothing is given a red tag, medium size clothing is given an orange tag, and small size clothing has a green size. The system analyzes the UPC to identify the type of clothing and analyzes image data associated with the colored tags to determine a size of each instance of the clothing item. The system utilizes this data to filter clothing items in accordance with a size of the user to enable the user to more quickly and accurately identify clothing items in an appropriate size.

In another example, each instance of a garment has a different RFID tag. The system utilizes sensor data obtained from each RFID tag to identify garments/clothing items in an appropriate size for the user. The correct sized clothing items are highlighted or otherwise associated with a positive item indicator. Clothing items in a different size than the user's clothing size are filtered out.

The customized AR filter component analyzes sensor data generated by the sensor device(s) 206 to identify the items in the plurality of items 130 and/or identify the location of the user device 202. In this example, the customized AR filter component executing on the user device 202 generates a set of filtered items 222, including items 210 and 214 but excluding items 212 and 216. The set of filtered items 222 includes items filtered for the user 226. The set of filtered items 222 are displayed in an AR display 224 generated by the user device 202 with positive item indicators. The AR display 224 is a three-dimensional AR image including both real-world elements as well as virtual/graphical elements. The AR display 224 is a display such as, but not limited to, the AR display 138 in FIG. 1.

The items excluded from the set of filtered items can be blocked, hidden, grayed out, obscured, or otherwise deleted/removed from the AR display 224 to assist the user in identifying items of interest to that user. Thus, in some examples, the AR display hides or obscures low-interest (filtered/invalid) items and highlights high-interest items. The AR display can also provide additional information associated with high-interest items. Additional information is not provided for low-interest items.

In an example, if the plurality of items 130 includes breakfast cereals, item 210 can include a brand "A" cereal, item 212 can be a brand "B" cereal, item 214 can be an organic variety cereal, and item 216 can be a generic value cereal. If the user 226 prefers brand "A" items and organic items, the customized AR filter includes item 210 brand "A" and item 214 "organic" brand items in the set of filtered items for the user 226.

The sensor device(s) 228 on a different user device 204 associated with a different user 232 viewing the same plurality of items 130 generates sensor data including images of the plurality of items 130. The customized AR filter component on the user device 204 utilizes the user preferences and/or transaction history data for the user 232 to generate a different set of filtered items 230 customized for user 232.

For example, if the user 232 prefers brand "A" items and lower priced, value items but has little/no interest in organic items, the set of filtered items can include item 210 brand "A" and item 216 value item. The set of filtered items 230 are presented within an AR display 234 output to the user 232 via the user device 204.

In some example, the physical set of shelves 220 includes a digital output device 235. The digital output device 235 can include, without limitation, a light emitting diode (LED) display, a digital display, or any other type of digital output device. The digital output device 235 outputs default content 236, including shelf identifiers, item identifiers, item pricing information, item size information, promotional information, as well as any other default content.

In other examples, the user device 202 sends customized content 238 to the digital output device 235 for output to the user 226 when the user device detects the digital output device within a predetermined range/distance of the user device. In other examples, the digital output device 235 displays customized content received from the user device for so long as the digital output device detects the user device within a predetermined range of the digital output device. A geofence area can be utilized to define the predetermined area. When the user device is within the geofence area, the digital output device displays the customized content received from the user device.

The customized content 238 can include content associated with items preferred by the user, such as high-interest items in the set of filtered items 222. In one example, the customized content includes information associated with item 210 and/or item 214.

When the user device 202 is no longer within the predetermined range of the digital output device 235, the digital output device 235 resumes displaying the default content 236. In other examples, when the user device 202 is detected within the predetermined range of the digital output device 235, the user device 202 sends customized content associated with item 210 and/or item 216 to the digital output device 235. The digital output device 235 outputs the customized content 238 while the user device 204 is within range of the digital output device 235 for viewing by the user 232.

A geofence can be utilized to determine whether to display customized content on the digital output device 235. In this example, if the user device is within a geofence area associated with the digital output device 235, the digital output device 235 pings the user device to request the customized content. In other examples, the user device automatically sends the customized content associated with a high-interest item to the digital output device 235 in response to detecting/entering the geofence area. The digital output device 235 displays the customized content as long as the user device is within the geofence area. When the user device is no longer within the geofence area, the digital output device 235 resumes display of default content.

The customized content 238 can be sent to the digital output device 235 from the user device 202 via the network 112. The network 112 can include a BLUETOOTH®, a beacon transmitter, a LAN, a WAN, or any other type of network.

Figure 3:
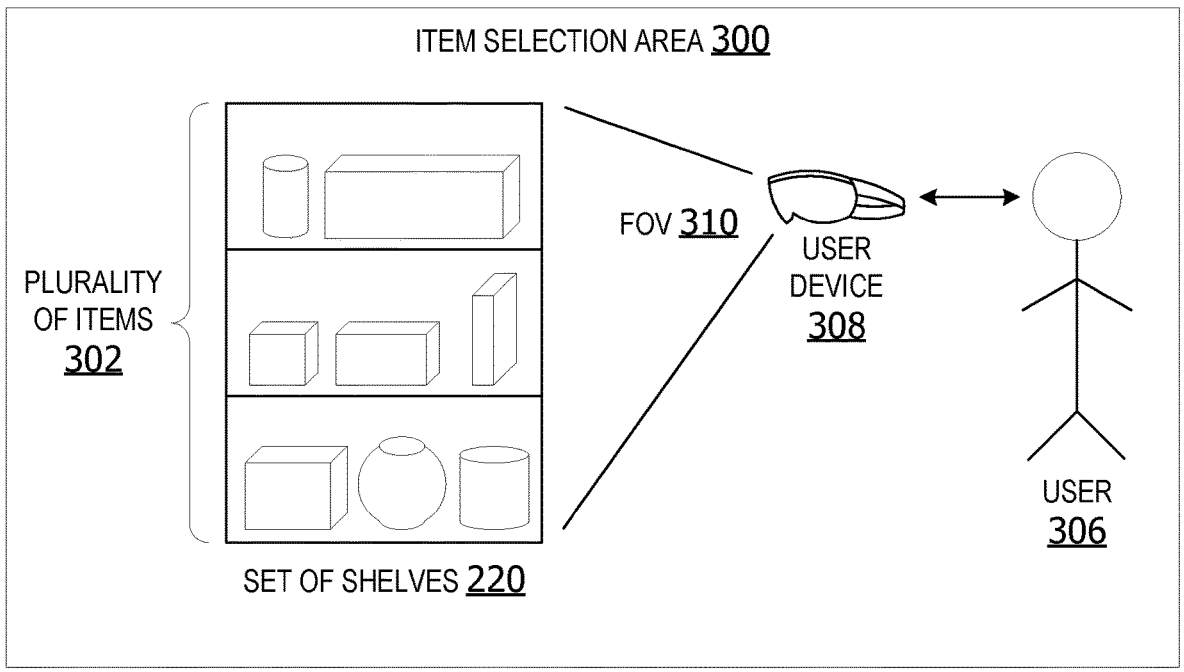
FIG. 3 is an exemplary block diagram illustrating an item selection area.

FIG. 3 is an exemplary block diagram illustrating an item selection area 300. The item selection area 300 is an area including item displays and/or a plurality of items 130. The item selection area 300 can include a store or other retail environment. The item selection area 300 can include an indoor area and/or an outdoor area having one or more items displayed for selection and/or purchase by one or more users.

The plurality of items 130 includes any type of items. The plurality of items 130 can be displayed on the set of shelves 220. The set of shelves 220 can include one or more shelves, a refrigerated display cabinet, a freezer display, a dairy case, a warm/heated display, a floor display, an end-cap display, a side counter, a gondola shelf unit, a modular aisle display, or any other item display area.

A user 306 associated with a user device 308 views an AR display including a real-world image of a portion of the item selection area 300 within a FOV 310 of the user 306 or the FOV of the user device 308 overlaid with an AR overlay. The user device 308 is a computing device, such as, but not limited to, the computing device 102 in FIG. 1, the user device 116 in FIG. 1, the user device 202 in FIG. 2, and/or the user device 204 in FIG. 2. In this non-limiting example, the user device 308 is an augmented reality glasses or head-set. In other examples, the user device 308 includes a tablet, cellular telephone, or other mobile computing device.

In some examples, the item selection area 300 includes one or more sensor devices for identifying a location of the user device within the item selection area 300. For example, the item selection area 300 includes image capture devices, beacon transmitters, beacon receivers, infrared (heat) sensors, proximity sensors, etc. The system in these examples analyzes the sensor data generated by the sensor device(s) to determine when an identified user is within proximity to a digital output device or other display area for customizing displayed content. In an example, IR sensor data is utilized for three-dimensional mapping of an area associated with the user device to identify a location of the user device within the item selection area and/or identify a plurality of items located within a given range of the user device.

Figure 4:
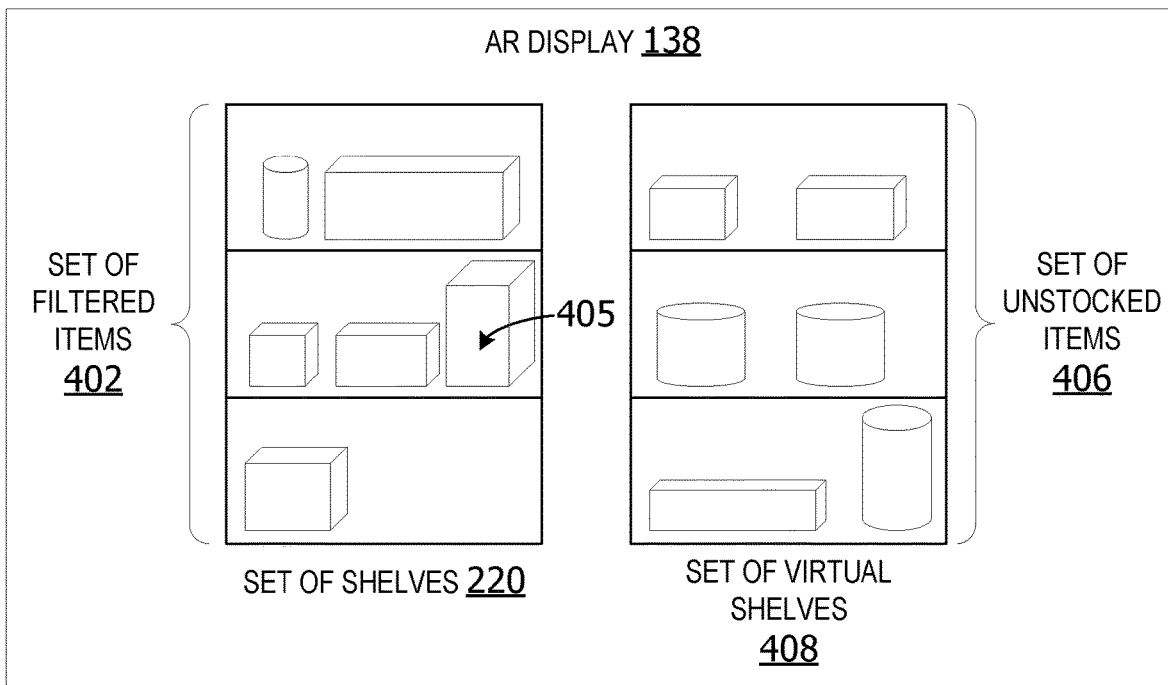
FIG. 4 is an exemplary block diagram illustrating an AR display.

FIG. 4 is an exemplary block diagram illustrating an AR display 138. The AR display 138 is a three-dimensional image including real-world images of a portion of the item selection area, including a set of filtered items 402 physically present on a set of shelves 220. The set of shelves 220 is a set of real-world shelves physically present in the item selection area. The set of filtered items 402 includes items having positive item indicators and/or items having negative item indicators. Positive item indicators can include highlighting, bolding, color, flashing indicators, enlarged graphical image of the item, arrows or other indicators identifying one or more items as items predicted to be of interest to the user. The negative item indicators can include greying out, covering/hiding, removing the item, etc.

In some examples, the set of shelves 220 in the AR include high-interest items physically present on the shelf as well as one or more un-stocked virtual items not physically present on the shelf which is represented by a graphical element, such as item 405. In this example, the graphical element 405 mimics an appearance of a three-dimensional item. For example, if the set of high-interest items includes olive oil and coconut oil jars which are physically present on the shelf and the system determines the user can be interested in avocado oil, which is currently out-of-stock on this shelf, but available in the backroom/storage, the system can add a three-dimensional graphical element representing the jar of avocado oil displayed on the set of shelves 220. If the user selects the jar of avocado oil, the system sends a notification to another user, such as a stocking manager, to re-stock the item and/or redirects the user to an order form/webpage where the user can order the item for deliver or later pickup.

The set of un-stocked virtual items 406 is a set of one or more items not physically present within the FOV 310 of the user 306 and/or the user device 308. An un-stocked item can include an item available in another location within the item selection area (different shelf), available in a storeroom/backroom, available for order from a distribution center, available for order from another store, etc. The graphical representation of each un-stocked item in the set of un-stocked virtual items 406 can be displayed on one or more virtual shelves or other displays.

The set of virtual shelves 408 includes a graphical representation of one or more shelves or other displays that are not physically present in the item selection area. The set of virtual shelves 408 can be referred to as "ghost" shelves. A virtual shelf or other virtual item display can be displayed within the AR display 138 overlaid over areas of the item selection area 300 where a real-world physical shelf/display could not be located. In a non-limiting example, the AR display 138 includes a virtual shelf/display overlaid on the real-world location of a wall, a walkway/aisle, in front of a door/elevator, or other location where physical shelves could not be placed. In another example, a graphical representation of the virtual shelf in the set of virtual shelves 408 hovers off the ground or floating above a physical shelf within the AR display.

Figure 5:
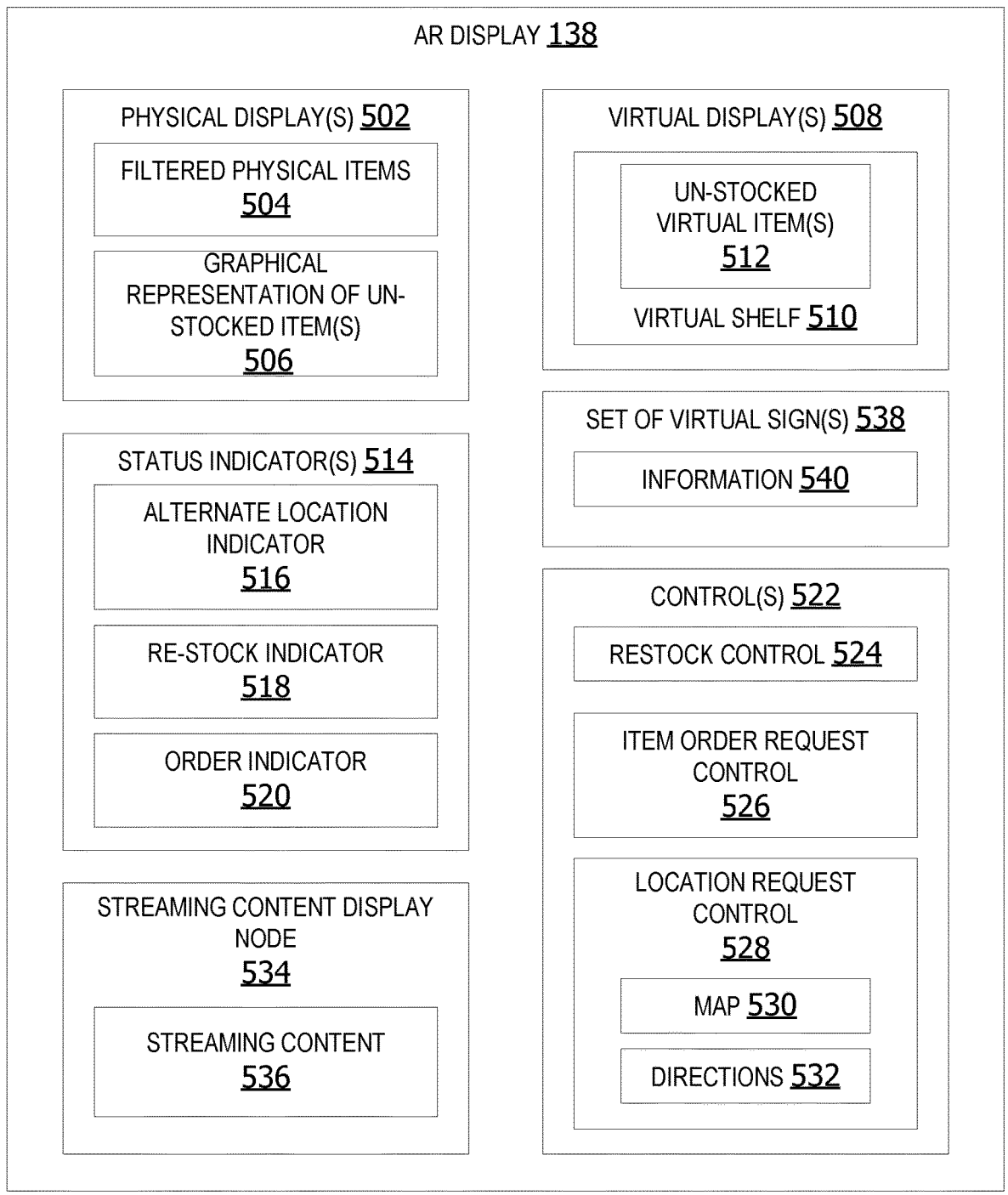
FIG. 5 is an exemplary block diagram illustrating an AR display including un-stocked virtual items.

FIG. 5 is an exemplary block diagram illustrating an AR display 138 including un-stocked virtual items. The AR display 138 in this example includes physical display(s) 502 including filtered physical items 504 and/or graphical representation of un-stocked item(s) 506. The physical display(s) 502 include an image of a physical display. The filtered physical items 504 includes images of physical items within the item display area conforming to the user's preferences/filter criteria. In other words, the filtered physical items 504 is an item physically present in the item selection area that is predicted to be of interest to the user based on the user's preferences, the user's transaction history data, and/or the selection criteria.

The virtual display(s) 508 is a graphical representation of one or more displays within the AR display which are not physically present in the item selection area. The virtual display(s) 508 includes un-stocked virtual items(s) 512 available from another location for request, order, deliver, and/or later pickup.

The AR display 138 can include status indicator(s) 514 associated with each item in the filtered physical items 504 and/or the un-stocked virtual item(s) 512. The status indicator(s) 514 can include an alternate location indicator 516 indicating that an un-stocked item is available at another location within the item selection area. A re-stock indicator 518 associated with an item in the AR display indicates an item is available in a backroom or other storage area in the item selection area. For example, if the user's preferences, search terms (desired item attributes), and/or other filter criteria indicate an item currently out-of-stock (OOS) on a shelf but available in a backroom/storage area, the system provides a graphical representation of the item which is not physically present on shelf with a re-stock indicator. If the user selects the re-stock indicator, the system sends the re-stock notification to a restock manager requesting additional instances of the OOS item from the backroom/storage area be brought to the sales floor for restocking the shelf and/or bringing a requested number of instances of the OOS item to the user requesting the restock.

An order indicator 520 indicates an un-stocked item is available for order from another remote location, such as, but not limited to, a distribution center or another store/local marketplace, for delivery to the user and/or later pickup at the item selection area.

Control(s) 522 can be provided, such as, but not limited to, restock control 524. User selection of the restock control 524 triggers sending a notification to another user to restock the physical display and/or bring one or more items from the backroom/storage area to the user. This enables the item filtering system to be linked to inventory for re-ordering/restocking items and/or updating inventory. The restocking option is provided if sufficient numbers of items are available within the on-hand inventory.

The item order request control 526 when selected by a user triggers sending a link or order form to the user device associated with the user. The location request control 528 can be selected by the user to obtain map 530 and/or directions 532 to another area or other location within the item selection area where a desired item can be found. For example, if the filtered physical items 504 includes black printer ink, the virtual display can include a set of virtual items associated with printer ink, such as, but not limited to, printer paper, frequently used with printer ink but not physically present on the same shelf as the printer ink. The user can select the location request control 528 to obtain map and/or directions to an aisle or other area of the item selection area where printer paper is displayed. The map and/or directions can be updated in real-time as the user is moving/walking through the item selection area. If a user turns down the wrong aisle, the map and/or directions can be updated in real-time to redirect the user to the correct location. The directions can include arrows and/or direction indicators within the AR display directing the user to the location of another item.

The AR display 138 optionally include a streaming content display node 534 providing streaming content in real-time. The streaming content display node 534 is a graphical node, window, or other graphical element within the AR display 138 providing streaming content customized and/or selected by the user as the user views items in the item display area. The steaming content can include videos, movies, television shows, commercials, links to manufacture/supplier website, item reviews, item demonstration videos, etc.

The AR display 138 in other examples includes a set of one or more virtual sign(s) 538, including information 540 associated with one or more items predicted to be of interest to the user. A virtual sign is a sign which is not a physical sign in the real-world. The virtual sign exists only as a three-dimensional, graphical element within the AR display 138. The information 540 provided within a virtual sign can include, without limitation, name of items, pricing information, size information, ingredients, promotions/discounts, rebates, coupons, or any other information associated with the items.

Figure 6:
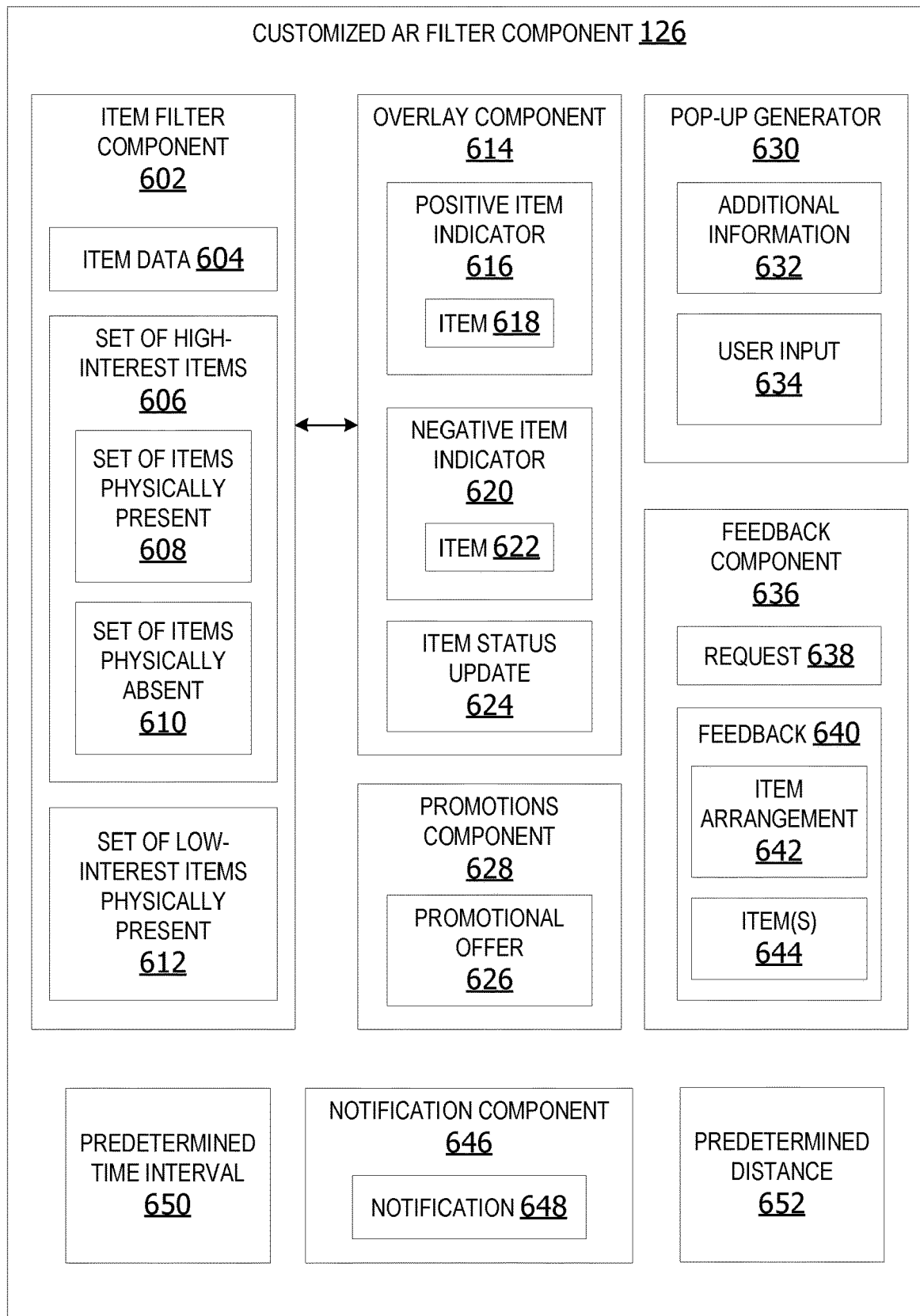
FIG. 6 is an exemplary block diagram illustrating a customized AR filter component.

FIG. 6 is an exemplary block diagram illustrating a customized AR filter component 126. The customized AR filter component 126 is a component running on a computing device for filtering items in real-time via an AR display. The customized AR filter component 126 includes an item filter component 602 in this example.

The item filter component 602 analyzes item data 604 associated with one or more items within a FOV of a user device in the item selection area. The item data 604 can include ingredients, brand name, nation of origin, state of origin, seasonality, price, coupons, discounts, rebates, promotions, organic certification, sugar content, fat content, gluten content, etc.

The item filter component 602 analyzes the item data 604 in some examples using a set of weighted selection criteria and a set of user preferences. The item filter component 602 identifies a set of high-interest items 606 and a set of low-interest items 612 customized for a selected user based on the analysis.

The set of high-interest items 606 can include items in the same or similar brand-line as a selected item. Items in the same brand-line are items designed to be used together or in conjunction, such as, but not limited to, a bottle of shampoo and a bottle of conditioner by the same brand. Thus, if a user selects a bottle of shampoo in brand "A", the set of high-interest items 606 can include brand-line items for brand "A", such as brand "A" condition, hair spray, anti-frizz cream, etc.

The set of high-interest items 606 can include items frequently used together. For example, if the user selects chips, the set of high-interest items 606 can include salsa or guacamole dip. In another example, if a user selects a box of cereal, the set of high-interest items 606 can include milk.

The set of high-interest items 606 can also reflect purchase patterns by a selected user. For example, if the user frequently purchases organic items, the set of high-interest items can include all organic varieties of items within the FOV of the user or the FOV of the user device associated with the user. In another example, if the user demonstrates brand-loyalty for a brand "B", the set of high-interest items 606 can include all items associated with brand "B" within the FOV of the user or the FOV of the user device associated with the user.

The set of high-interest items 606 is a set of one or more items physically present 608 within the FOV of the user device. In other examples, the set of high-interest items can also include a set of one or more items physically absent 610 from the FOV of the user device predicted to be of interest to the user. The high-interest items absent from the FOV of the user can be referred to as un-stocked items.

The set of high-interest items 606 can include sub-sets of items having varying degrees of compliance with search terms. For example, the set of high-interest items can include a first sub-set of highest/best matching items which have attributes matching most of the user's indicated preferences/filter criteria ninety percent match to one-hundred percent match). A second sub-set of items can include items having attributes conforming to fifty to seventy-five percent of the user's desired attributes, and a third sub-set of items can include items matching one-third to one-half of the user's desired attributes, and so forth.

In another example, the set of high-interest items 606 includes a first sub-set of items the user has previously selected/purchased, a second sub-set of items that are new items recently added to inventory which the user has not tried/may not be aware of, and/or a third sub-set of items having promotional offers associated with them.

An overlay component 614 assigns a positive item indicator 616 to each item in the set of high-interest items, such as, but not limited to, the item 618. The positive item indicator 616 can include a graphical element highlighting the item 618, enlarging an image of the item 616, a flashing indicator, a strobing indicator, a color overlay, etc. In one example, the overlay component 614 assigns a first positive indicator to previously purchased items which the user has prior experience utilizing, a second positive item indicator to high-interest items which are new/the user has never tried, and/or a third positive item indicator associated with promotional high-interest items which are associated with a bonus/larger package size, rebate, coupon, BYGO offer, reduced price, or another discount. In this example, the first positive item indicator, the second positive item indicator and the third positive item indicator each have a different appearance. In other words, the first positive item indicator looks different than the second positive item indicator and the third positive item indicator.

In still other examples, the overlay component 614 assigns a different positive item indicator for items in the set of high-interest items that conform the closest to the user's preferences and/or search filters, such as items having seventy-five to one-hundred percent match with filter/search terms. Another different positive item indicator to items in the set of high-interest items having less than the seventy-five percent conformance/matching with the user's search/filter terms. In another example, a different third positive item indicator can be assigned to items having fifty percent or less matching with the user's search criteria/filter terms. In this manner, high-interest items are distinguished based on which items are a best match with the desired attributes and which high-interest items have least/fewest of the desired attributes.

The overlay component 614 assigns a negative item indicator 620 to each item in the set of low-interest items, such as the item 622. The negative item indicator 620 can include greying out the item, shrinking or minimizing an image of the item, removing an image of the item/covering or hiding an image of the item, etc.

The overlay component 614 in other examples can include an item status update 624. The item status update 624 is an update changing a negative item indicator to a positive item indicator in response to receipt of a new promotional offer 626 associated with the item and/or receipt of new user input indicating interest in the item, type of item, and/or classification of an item.

For example, if the user is only interested in items within a given price range and a new promotional offer 626 is received in real-time which lowers the price of the item 622 bringing it within the price range, the item can be moved from the set of low-interest items to the set of high-interest items. In this example, the negative item indicator for the item 622 can be changed to a positive item indicator reflecting the lower price in response to the promotional offer 626.

The promotional offer 626 can be received by a promotions component 628 in some examples. The promotions component 628 is a component for receiving promotional offers in real-time from one or more suppliers via a network connection, such as the network 112 in FIG. 1 and/or FIG. 2. The promotions component 628 analyzes promotional offers in real-time using the selection criteria and user preferences to determine whether an offered promotion qualifies a low-interest item to be moved to the set of high-interest items. This enables the filter to utilize real-time bids or supplier-provided coupons to reduce cost or increase potential user interest in an item previously filtered-out/identified as a low-interest item.

In another example, if the user had previously expressed no interest in organic items, but while shopping the user verbally requests information on organic options, the item filter component can move all organic items from the set of low-interest items to the set of high-interest items in response to the user input indicating a new interest/preference for organic items.

The customized AR filter component 126 optionally include a pop-up generator 630. The pop-up generator 630 outputs additional information 632 associated with at least one item in the set of high-interest items 606 within the AR display in response to receiving a user input 634 associated with the at least one item. The user input 634 can be received via a user interface, such as, but not limited to, the user interface component 110 in FIG. 1. The additional information 632 includes item data, online purchase information, link(s) to website for ordering/requesting an item, a restocking request control, suggested recipes, suggested brand-line items to be used in conjunction with a selected item, suggested related items to be used in conjunction with a selected item, etc.

The user input includes input provided by the user, such as verbal input, gestures, selection of an item, text input, etc. For example, the system utilizes analytics to determine which items the user picks up, looks at an item, touches, puts back on the shelf, places in a cart, how long the user looked at an item, etc. The verbal input can include search/filter terms, such as, but not limited to, desired item attributes and/or undesired item attributes, etc. If a user looks at an item for five seconds, it can be more significant/indicate greater interest than if the user only looks at it for one second.

A feedback component 636 in some examples outputs a request 638 for feedback 640 associated with an item arrangement 642 within the AR display or feedback associated with one or more item(s) 644 within the AR display selected for purchase by the user. Item arrangement 642 feedback can be generated by user(s) rearranging items and/or virtual displays in the AR display. For example, if the AR display shows a graphical representation of children's cereals on a top shelf and high fiber/low sugar cereals on a lower virtual shelf, the user can rearrange the AR display via user input to move the children's cereals to a lower shelf and move the lower sugar cereals to a higher shelf.

In some examples, feedback 640 associated with item arrangement 642 aggregated from a plurality of users can be analyzed to identify preferred item placement/preferred item arrangements. This feedback can be utilized to redesign and/or update physical item displays within the item selection area.

The item(s) 644 feedback 640 can include feedback associated with whether items in the set of high-interest items 606 are selected by the user, whether the user indicates a preference for items placed in the low-interest set of items, feedback rating items, etc.

A notification component 646 is a component for sending a notification to one or more users. The notification component 646 can send a restock/out-of-stock notification to a first user/restock manager to restock a shelf in response to a second user selecting a restock control within the AR display requesting restocking of an item. The notification component 646 in other examples sends a notification to a first user requesting assistance for a second user in locating an item or retrieving an item that is currently on a shelf too high for the second user to reach.

The AR display generated by the customized AR filter component 126 is updated in real-time on a regular interval, such as, but not limited to, a predetermined time interval 650. The predetermined time interval can be any user-defined time-period at which new image data or other sensor data is generated for updating the AR display. The predetermined time interval 650 can be, without limitation, a one second time interval, a five second time interval, a thirty-second-time interval, or any other suitable time-period for updating an AR image.

The customized AR filter component 126 performs filtering on items within a predetermined distance 652 of a user device associated with the user in some examples. The predetermined distance 652 is a range or zone associated with the user device. The predetermine distance 652 can include the FOV of an image capture device associated with the user device. The predetermined distance can be a user-defined radius utilized to define an item filtering zone, such as, but not limited to, five feet radius, eight feet radius, or any other measurement.

Figure 7:
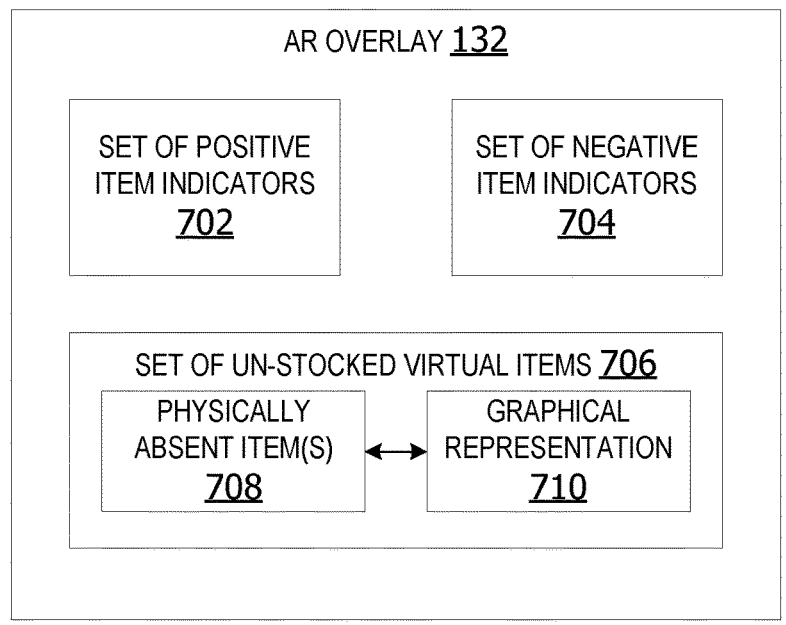
FIG. 7 is an exemplary block diagram illustrating an AR overlay.

FIG. 7 is an exemplary block diagram illustrating the AR overlay 132. The AR overlay 132 includes a set of positive item indicators 702, a set of negative item indicators 704 and/or a set of un-stocked virtual items 706. The set of un-stocked virtual items 706 can include a graphical representation 710 of one or more physically absent item(s) 708.

Figure 8:
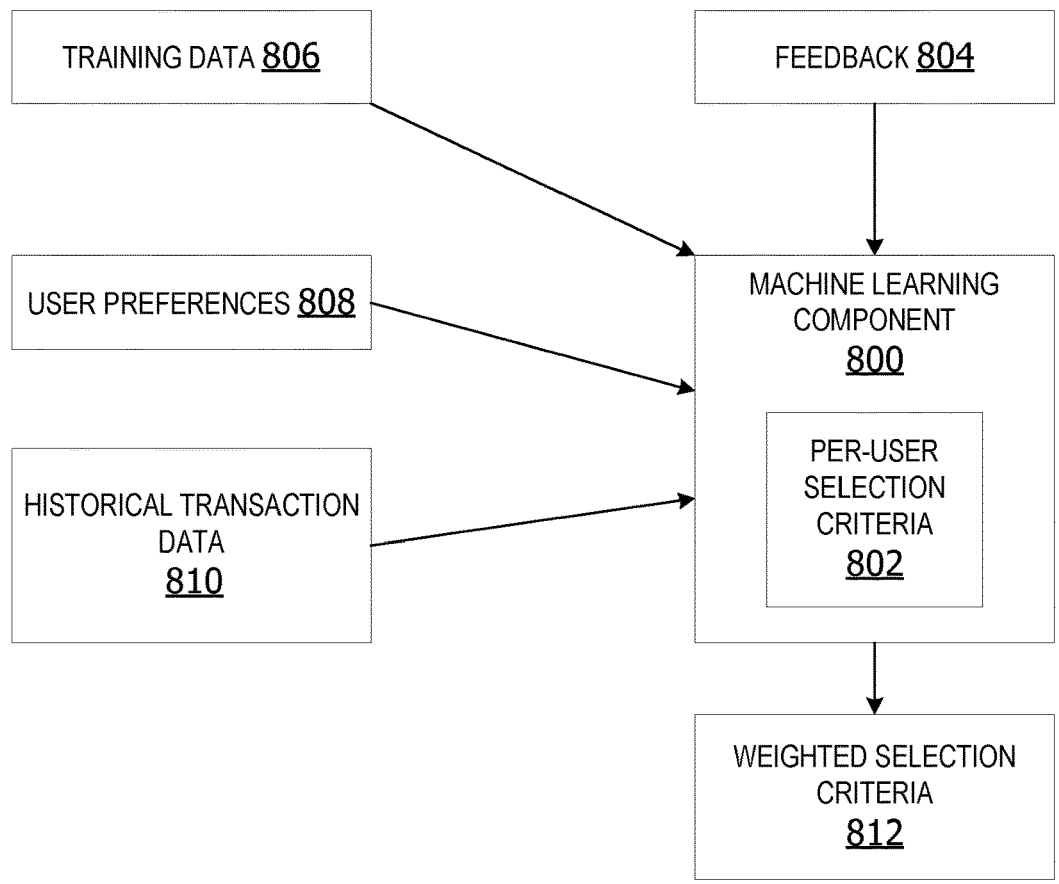
FIG. 8 is an exemplary block diagram illustrating a machine learning component.

FIG. 8 is an exemplary block diagram illustrating a machine learning component 800. The machine learning component 800 analyzes per-user selection criteria 802 using feedback 804, training data 806, user preferences 808, and/or historical transaction data 810.

The feedback 804 can include item review feedback, feedback associated with arrangement of items on a display, and/or feedback associated with accuracy of customized item filtering. If the system filters items to identify high-interest items the user does prefer and filters items the user is uninterested in viewing, the feedback can be good/indicating accurate filtering. If the system selects high-interest items which are not actually of interest to the user or if desired items are filtered out, the feedback can be poor.

The user preferences 808 can include user-selected AR display preferences. For example, the user preferences 808 can include a user-selected color for display of virtual shelves within the AR display. In another example, the user preferences can specify a preferred item arrangement, such as child-related items on lower shelves or candy/sweets on higher shelves within the AR display.

The machine learning component 800 utilizes real-time data, such as the feedback 804 to adjust weights associated with each of the selection criterion. For example, if selection criteria indicate the user prefers to save money/emphasize value but the user also prefers brand-name products, the selection criteria are weighted to indicate which criterion has greatest precedence.

The machine learning component in some examples utilizes the user's feedback and transaction data associated with items the user purchases to adjust the selection criteria weights. In the example above, if the user frequently purchases brand name items using coupons or in conjunction with other promotions, the machine learning component 800 can generate weighted selection criteria 812 indicating greatest preference should be given to promotions/discounts associated with brand name items.

Figure 9:
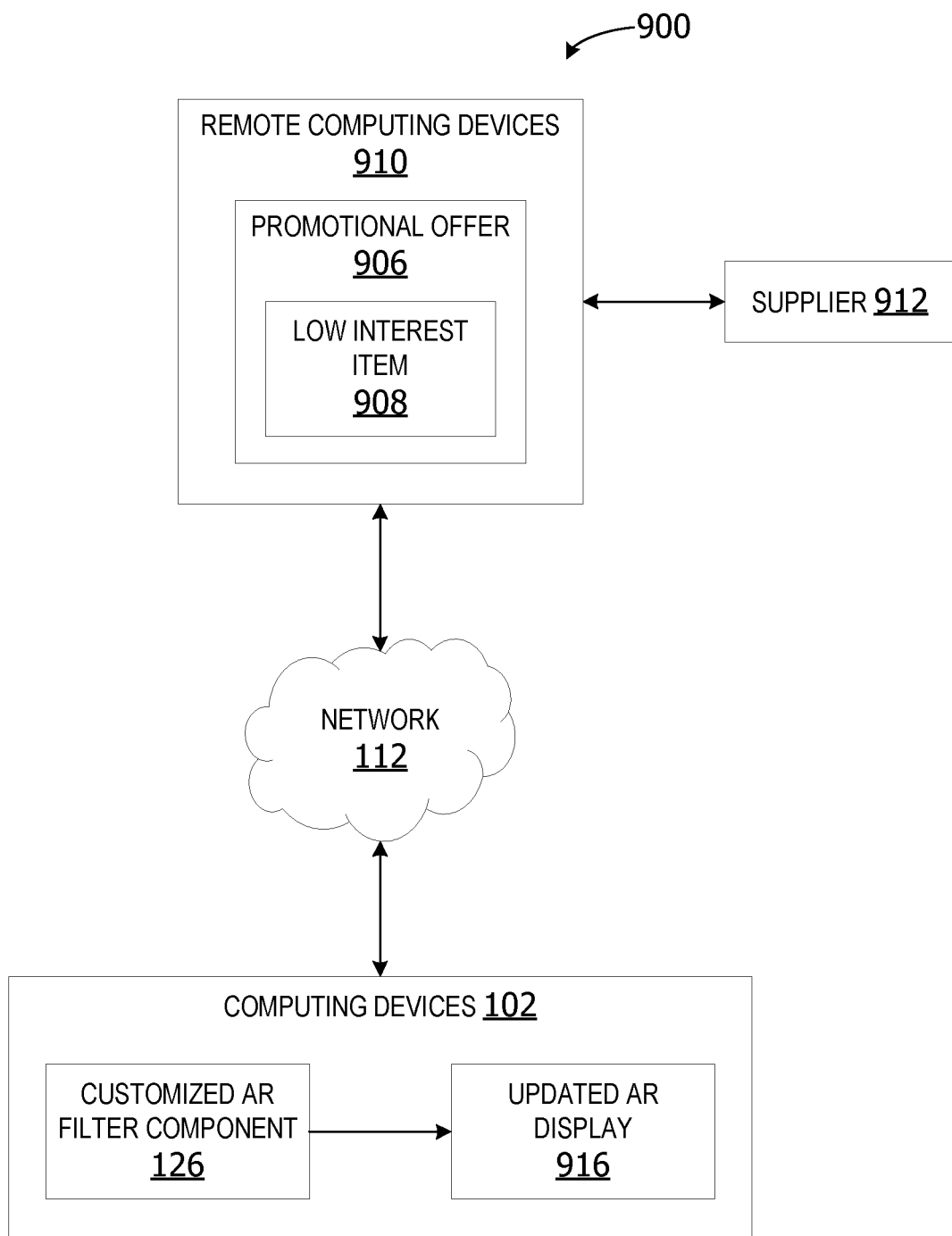
FIG. 9 is an exemplary block diagram illustrating a system 900 for updating an AR display in real-time based on promotional offers.

FIG. 9 is an exemplary block diagram illustrating a system 900 for updating an AR display in real-time based on promotional offers. A computing device 102 running a customized AR filter component 126 can receive a promotional item 906 associated with a low-interest item 908 from a remote computing device 910 associated with a supplier of the low-interest item 908. The remote computing device 910 in some examples receives a notification from the customized AR filter component 126 identifying an item provided by the supplier 912 as a filtered (low-interest) item. The supplier 912 can dynamically send the promotional offer 906 in real-time to the customized AR filter component 126 via the network 112. The supplier receives a real-time alert regarding filtering of the item. The supplier has an opportunity to bid and/or offer discounts or coupons in real-time to change filtering of items provided by the supplier. The promotional offer can include a price discount, offer of a free item with purchase of an item, a rebate offer, etc.

In another example, the promotional offer can include a supplier fee paid by the supplier to move an item provided by the supplier from the set of low-interest items into a set of neutral (unfiltered items) and/or into the set of high-interest items. A neutral/unfiltered item is an item which is displayed within the AR as it would normally appear in the real-world without any alterations. In other words, a neutral item would be displayed without positive item indicators, such as highlighting. Neutral items are also displayed without negative item indicators, such as greying out, obscuring, etc.

In still another example, a supplier can provide a fee or other promotional offer to the user and/or to the system to qualify an item for placement within a virtual shelf/ghost shelf of items which do not match search/filter terms, but which are displayed within the AR display for viewing without negative item indicators. In some examples, if a user indicates a desire for items within a given price range, the system can display items which are outside the price range but close (within a predetermined upper end of the price range/exceeding maximum price by a predetermined amount) on a separate virtual shelf for viewing by the user if the supplier of those items provides a promotional offer or other incentive associated with the item.

In one example, if a user specifies a maximum price of five dollars for an item, the system can include items having a price between five dollars and seven dollars on a virtual shelf without negative item indicators. In another example, items having a price exceeding the five-dollar maximum but associated with a rebate or other promotion, such as a buy-on-get-one (BYGO) free offer can be displayed on a separate virtual shelf with a promotional discount indicator informing the user that these items are within the specified price range after the promotion.

The customized AR filter component 126 can generate an updated AR display 916 in response to the promotional offer 906. The updated AR display 916 changes the low-interest item to a high-interest item.

Figure 10:
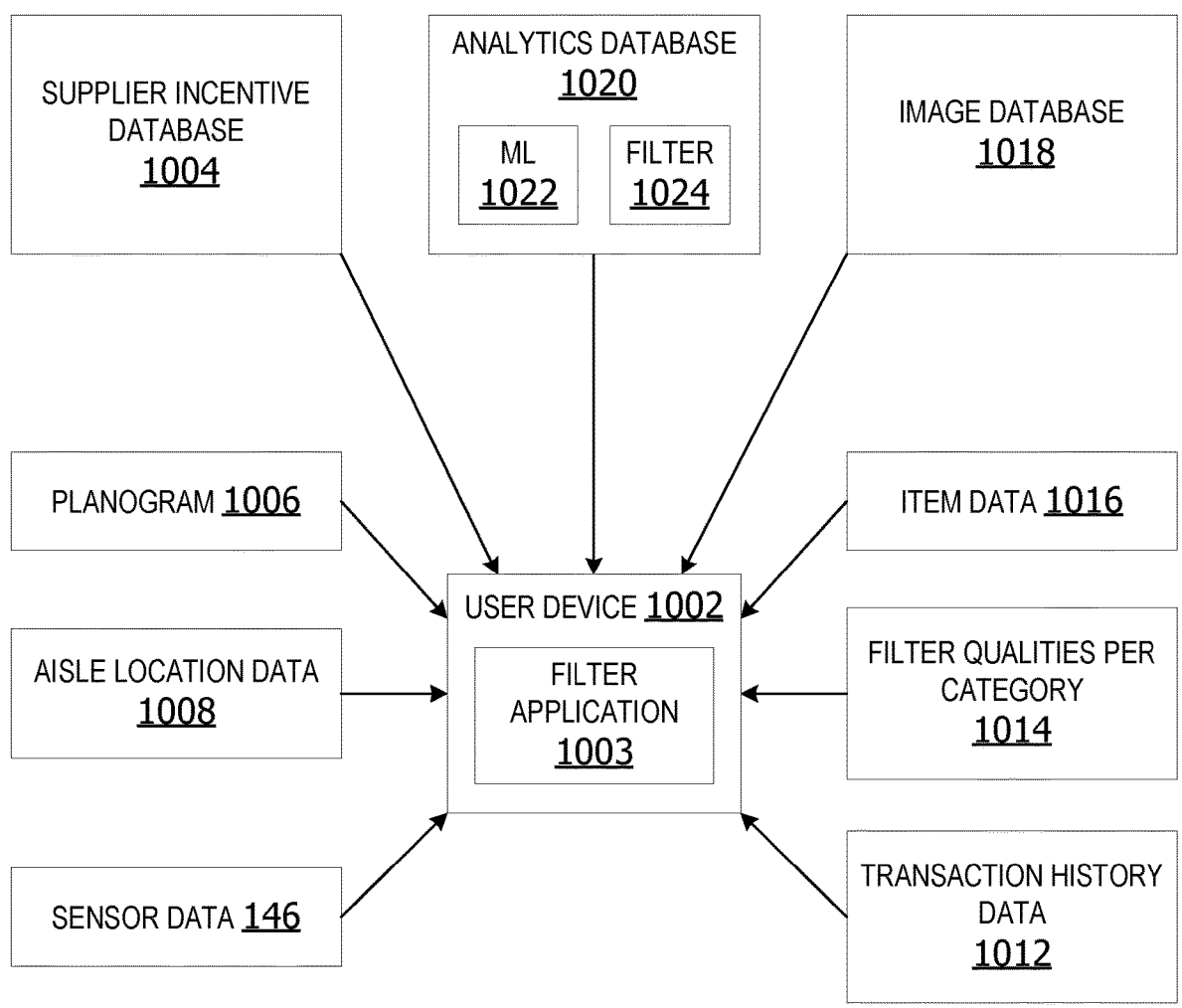
FIG. 10 is an exemplary block diagram illustrating a user device for generating a real-time AR display.

FIG. 10 is an exemplary block diagram illustrating a user device 1002 for generating a real-time AR display. A filer application 1103 on the user device 1002 aggregates data from a plurality of sources in real-time and utilizes the aggregated data to generate and/or update the AR display dynamically. The filter application is an application for filtering items in an AR display, such as the filter application 142 in FIG. 1. In some examples, the user device obtains data from a data storage, such as the data storage device 120 in FIG. 1 or a cloud storage.

The user device 1002 receives promotional offers/promotional data from a supplier incentive database 1004. The supplier incentive database 1004 includes data associated with rebates, coupons, discounts, sales, or other promotions associated with one or more items. In some examples, the promotions include discounts or incentives associated with new items to encourage a user to try a new item. This enables suppliers to get new items added onto a user's filtered item list and/or get an item that has been filtered out added back onto the high-interest items list or neutral items list. A neutral item is an item that is not in the high-interest item list or the low-interest filtered item list. Neutral items are not associated with positive item indicators or negative item indicators.

For example, if a user's preferences specify filtering items outside a user-selected price range, the supplier can offer a promotion, such as a coupon or other discount, to lower a price of a given item down into the user's selected price range. This enables a supplier to identify an item which would be filtered out due to price and offer to discount the item to prevent the item from being filtered out due to price in real-time. The system dynamically adjusts filtering of items based on real-time data received from the user searching for an item as well as suppliers of items.

Planogram 1006 data includes data describing where items are located/placed on shelves or other displays. The planogram 1006 can also include information, such as, the number of each type of item on each shelf/display, schematics, visual representations of items in store, diagram/model indicating assigned location(s) of items on shelves/displays, and/or store layout.

The aisle location data 1008 identifies what types of items are on each aisle, what items are on each shelf on each aisle, orientation of shelves of aisles, number of items on each aisle, etc. The item filter component cross-references planogram 1006 and aisle location data with item image data to identify the location of the user device. The system in some examples sends planogram data, aisle location data, and item data for items within the identified location of the user device to the user device for utilization by the user device in creating the AR display.

Sensor data 146 is data obtained from one or more sensor devices, such as the sensor devices 118 in FIG. 1, the set of sensor devices 145 in FIG. 1, the sensor device(s) 206 in FIG. 2, and/or the sensor device(s) 228 in FIG. 2. The sensor data 146 can include image data of a portion of the item selection area including one or more items.

Transaction history data 1012 includes a history of items selected by a user during one or more previous transactions. The transaction history data 1012 can include an identification of high-interest items previously selected by the user and/or items identified as low-interest items which the user did select. This transaction data can be used to fine-tune the selection criteria and improve identification of items likely to be of interest to the user and items of low-interest or no interest to the user.

Filter qualities per category 1014 include one or more item selection criteria for identifying categories of items of interest to a user. The filter qualities per category can include categories such as, low-sugar category of items, gluten-free category of items, organic category of items, value category of items, family size category of items, baby-related category of items, pet-related category of items, and other categories.

The filter qualities per category 1014 can also include the number of criteria applied and/or the number of filter results output to the user. In an example, the filter qualities per category 1014 indicates a limit of five selection criteria to be applied during item filtering. In another example, the filter searches for first criteria limiting items to perfume, second criteria of women's perfume, third criteria of a brand of perform, fourth criteria of a price range, and fifth criteria indicating a preferred size (sample size, one-ounce bottle, etc.). Once these five filters are provided by the user, the filtering begins to obtain a first round of filtering results. If the user wants to add additional criteria, they can be added during a second round of filtering to fine-tune or further narrow the search results. In these examples, the output AR display only contains the user-specified number of items/filter results. This reduces the processor resources consumed during the AR filter to be limited/controlled.

For example, if the user is interested in the category of skin care items, the filters identify moisturizers, cleansers, sunscreen, or other items in the skin care category of potential interest to the user. Likewise, if the user indicates a desire to locate skin-care items for use at night, the filters identify night creams, makeup removers, and other skin care items designed for utilization at night. The filters narrow down the available items to assist the user in locating a desired item more quickly and efficiently while enabling the user to view the items in three-dimensional AR displays.

The item data 1016 includes data describing items. The item data 1016 can include ingredients, origin of item, country of manufacture, seasonality, price, size, number of items per unit, etc.

Image database 1018 is a database of image data, including, without limitation, item dimensions, packaging images, colors, item relationships, etc. The image database 1018 can also include image data associated with shelves, displays, and/or items in the item selection area. For example, the image database 1018 can include image data associated with a bottle of ketchup. The item filter component performs image recognition to identify items on the shelves/displays within the FOV of the user/user device, identify an empty shelf due to out-of-stock items, identify a location of the user device, etc.

The image recognition analysis is performed to compare image data generated by a user device with the known appearance of items/shelves to identify one or more items. In one example, if the system recognizes four different items together in one location, the system compares those items with planogram and aisle location data to determine the three-dimensional location of those four items within the item selection area.

For example, the system compares a known image of a bottle of ketchup, ketchup bottle label, ketchup bottle markers, or other identifying image data associated with ketchup bottles in inventory with image data generated by sensor devices associated with the user to identify bottles of ketchup in the FOV of the user device. This image data can be utilized to identify items within a FOV of the user/user device and/or identify the location of the user/user device. The known image data can include item dimensions, package color, label, bottle shape, bottle size, box size, label size, label design, etc.

In some examples, the system performs image analysis based on identification/comparison of markers on items where the items are very small in size and/or where item appearance or packaging for different items is very similar. In these examples, a marker on each item, such as a barcode, UPC, label, text on a label, image or graphic on a label, RFID tag, black and white marker, or other identifying marking on an item or shelf associated with an item is utilized to identify items within range of the user for AR item filtering. For example, if the user is looking at very small bottles of perfume or makeup, where all the package sizes are very similar, the filter component analyzes images of markers on the packages to identify which item the user is viewing rather than analyzing package size, color, or item appearance. When markers/items are identified, that information can be mapped to a planogram and/or aisle information data to determine a location of the user and/or user device, as well as identify items within a predetermined range of the user.

The analytics database 1020 includes algorithms/analytics used to perform item filtering within the AR. The analytics can include an item filter 1024 for identifying high-interest items and/or low-interest items. The analytics can also include machine learning (ML) 1022 for fine-tuning item selection criteria. The machine learning 1022 can include pattern recognition and artificial intelligence (AI).

In another example, the analytics database 1020 includes item identifier data, such as UPC data, RFID data, barcode data, matrix barcode identifiers, etc. The analytics database 1020 can also include a store number, timestamp associated with the item filtering, product categories, selected filters (positive and negative filters), and/or shopping instance for grouping date. A positive filter includes desirable items, categories, types, or properties of items. If a user prefers a specific brand, that brand can be used as a positive filter. A negative filter includes undesirable items, categories, types, or properties of items. For example, if a user is only interested in gluten-free items, gluten is a negative filter and gluten-free can be used as a positive filter.

The analytics database 1020 can provide data feeds into marketing trends. In other words, the analytics database 1020 aggregates data which can be analyzed to identify trends and local item preferences at an item-store level. The analytics database 1020 can also provide data feeds into a supplier incentive database 1004. The supplier incentive database 1004 can use filter data to display specific incentives for customer. The supplier incentive database 1004 allows the item filter to un-filter items that have incentives.

The analytics data is utilized to generate the AR display with the customized item filtering. In some examples, the system sends updated analytics data reflecting changes in the FOV of the user device, changes in items within the FOV, user input and/or new promotional data, at a predetermined time interval (every "x" seconds).

In these non-limiting example, the user device 1002 is a computing device such as the user device 116 in FIG. 1. The user device 1002 aggregates data from a plurality of sources for utilization during the item filtering, such as the supplier incentive database 1004. However, in other examples, the data is aggregated from the plurality of sources by a different computing device, such as the computing device 102 in FIG. 1. In still other examples, the data from the plurality of sources is aggregated onto a data storage for retrieval by the user device 1002.

Figure 11:
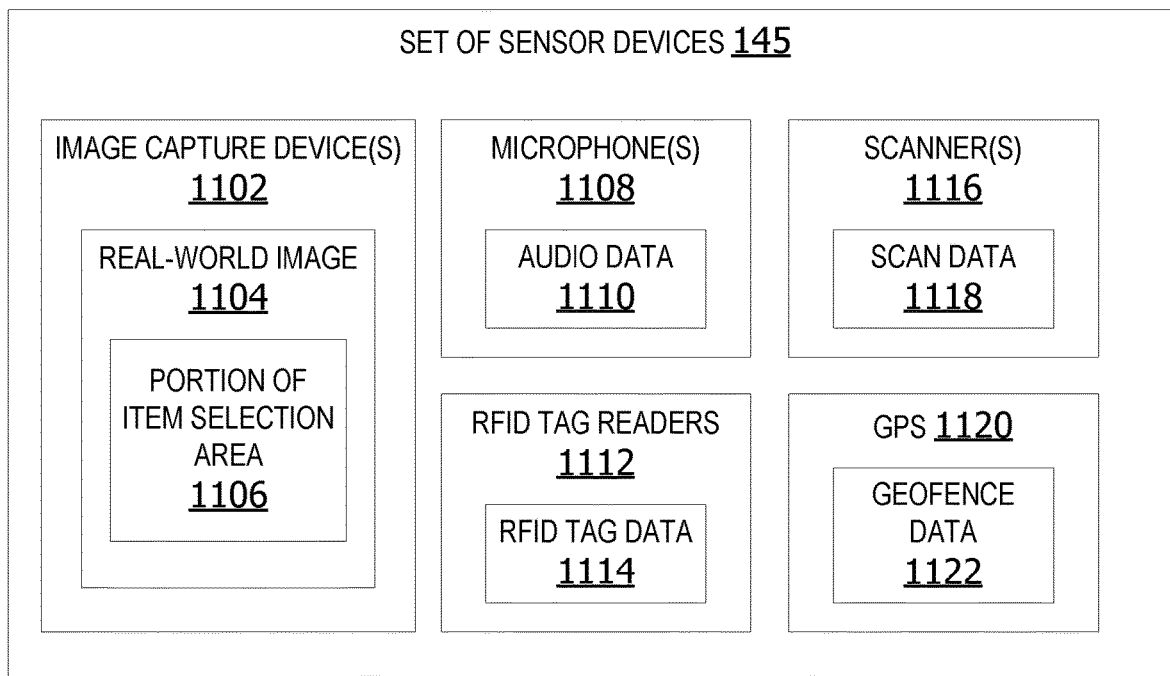
FIG. 11 is an exemplary block diagram illustrating a set of sensor devices.

FIG. 11 is an exemplary block diagram illustrating a set of sensor devices 145. The set of sensor devices 145 includes one or more image capture device(s) 1102 for generating a real-world image 1104 of a portion of an item selection area 1106. The set of sensor devices 145 can also include microphone(s) 1108 generating audio data 1110, such as, but not limited to, verbal queries/requests for assistance, verbal requests for information, and/or entering verbal search terms.

The set of sensor devices 145 optionally include RFID tag readers 1112 for reading RFID tags associated with one or more items. The RFID tag readers 1112 generate RFID tag data 1114. The RFID tag data 1114 can be utilized to identify the location of items and/or the location of the user device.

Scanner(s) 1116 include UPC readers, matrix barcode readers, QR code readers, etc. The scanner(s) 1116 generate scan data 1118 utilized to identify item(s) within the FOV of the user and/or the user device.

Global positioning system (GPS) 1120 devices can be utilized to identify the location of an item, a display, a scanner, and/or a user device. The GPS data can be utilized to generate geofence data 1122. The geofence data can be utilized to determine when a user device is within range of a digital output device, such as, but not limited to, the digital output device 235 in FIG. 2. When the user device is within the geofence area associated with a digital output device, the digital output device displays content received from the user device customized for the user. When the user device is outside the geofence area, the digital output device displays default content.

In other examples, the set of sensor devices include light sensors, proximity sensors, weight sensors, beacon receivers/transmitters, or any other types of sensor devices. The sensor data can be analyzed by the item filter component to identify items and/or identify a location of the user/user device.

Figure 12:
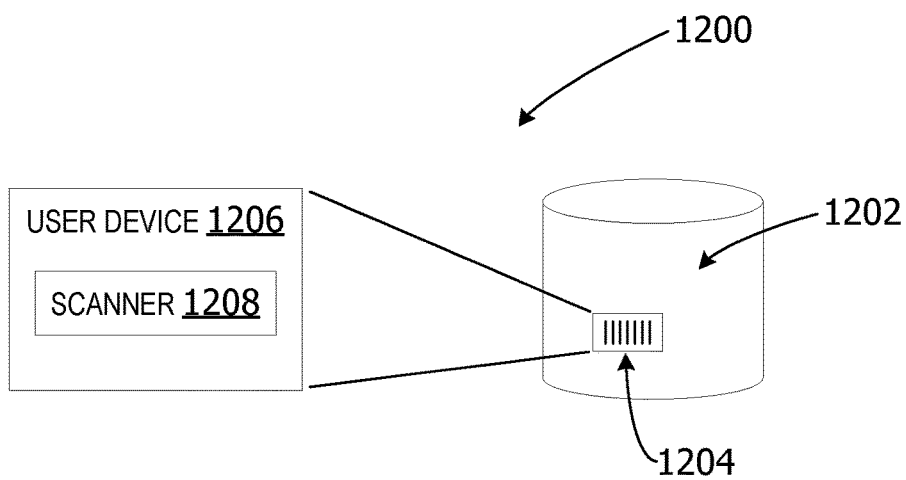
FIG. 12 is an exemplary block diagram illustrating a user device scanning an identifier on an item 1202.

FIG. 12 is an exemplary block diagram illustrating a user device scanning an identifier on an item 1202. The item 1202 is an item physically available on a physical shelf or other physical display within the item selection area. The item 1202 includes a marker 1204, such as a UPC, an RFID tag, a label, a black and white marker, or another identifier. The user device 1206 includes a sensor device, such as a scanner 1208, for reading the marker 1204. The user device 1206 utilizes the scan data generated by scanning the marker to identify the item 1202. In some examples, the user device 1206 utilizes a planogram and/or aisle location data to identify a location of the user device based on the identification of the item(s) and/or shelves(s) within the FOV of the user device.

In one example, the user device scans markers on a set of items within the FOV of the user to identify pickles, ketchup, mustard and other condiments. The user device analyzes planogram and aisle location data to identify the aisle, shelf, and/or other location identifiers associated with the assigned planogram locations of the pickles, ketchup, mustard and other condiments. The user device utilizes this information to determine the current location of the user device and/or user associated with the user device.

In other examples, the item filter identifies items by analyzes image data including images of the item(s). The item filter compares the image data with image data of one or more images in an image database, such as the image database 1018 in FIG. 10.

In other words, if the user device determines the identification of items within proximity to the user device, the user device locates those items on the planogram and aisle location data to determine the location of the user device within the item selection area.

The planogram data, aisle location data, image data, filter qualities, and item data are stored (aggregated) together in a single database in some examples. This enables the user device to obtain the planogram data, aisle location data and item data for utilization in generating the AR display using a single query to the database.

In another example, the planogram data and aisle location data is be stored in one database while the item data is stored in a separate database. The user device sends a query to an orchestration application. The orchestration application aggregates the planogram data, aisle location data, and item data from multiple sources and sends the data to the user device.

Figure 13:
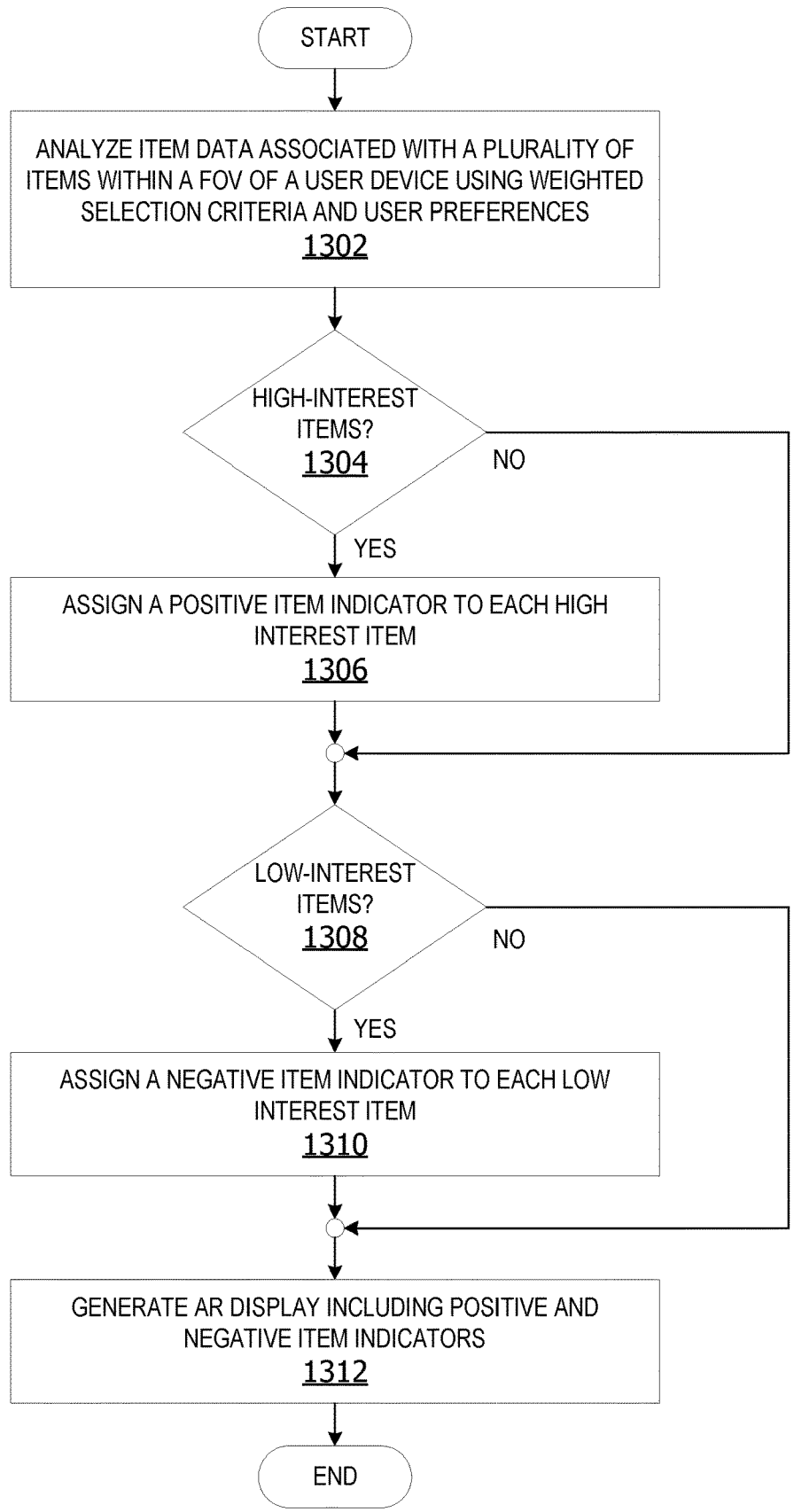
FIG. 13 is an exemplary flow chart illustrating operation of the computing device to generate a customized AR display for a user.

FIG. 13 is an exemplary flow chart illustrating operation of the computing device to generate a customized AR display for a user. The process shown in FIG. 13 can be performed by a customized AR filter component 126, executing on a computing device, such as the computing device 102 or the user device 116 in FIG. 1.

The process begins by analyzing item data associated with a plurality of items within a FOV of a user device using weighted selection criteria and user preferences at 1302. The plurality of items includes items physically present within at least one display in an item selection area, such as, but not limited to, the plurality of items 130 in FIG. 1, FIG. 2, and/or FIG. 3.

An item filter component determines whether there are any high-interest items at 1304. A high-interest item is an item predicted to be of interest to the user based on the user's preferences, the user's transaction history, and/or a set of selection criteria. A high-interest item can be an item such as items in the set of high-interest items 606 in FIG. 6. The item filter component is a customized item filter, such as the item filter component 602 in FIG. 6.

If the plurality of items does include any high-interest items, the item filter component assigns a positive item indicator to each high interest item at 1306. A positive item indictor is a graphical element indicating a high-interest item, such as, but not limited to, the positive item indicator 616 in FIG. 6 and the set of positive item indicators 702 in FIG. 7.

The item filter component determines whether the plurality of items includes any low-interest items at 1308. If yes, the item filter component assigns a negative item indicator to each low interest item at 1310. The negative item indicator is a graphical element associated with an item in the AR display indicating a low-interest item, such as, but not limited to, the negative item indicator 620 in FIG. 6 and/or the set of negative item indicators 704 in FIG. 7.

An AR generator generates an AR display including the positive and negative item indicators at 1312. The AR generator is an AR device for generating AR images, such as, but not limited to, the AR generator device 136 and the AR generator 144 in FIG. 1. The process terminates thereafter.

Returning to 1304, if there are no high-interest items in the plurality of items, the item filter component determines whether there are any low-interest items at 1308. If no, the AR generator generates the AR display at 1312. The process terminates thereafter.

While the operations illustrated in FIG. 13 are performed by a computing device, aspects of the disclosure contemplate performance of the operations by other entities. In some examples, a cloud service performs one or more of the operations.

Figure 14:
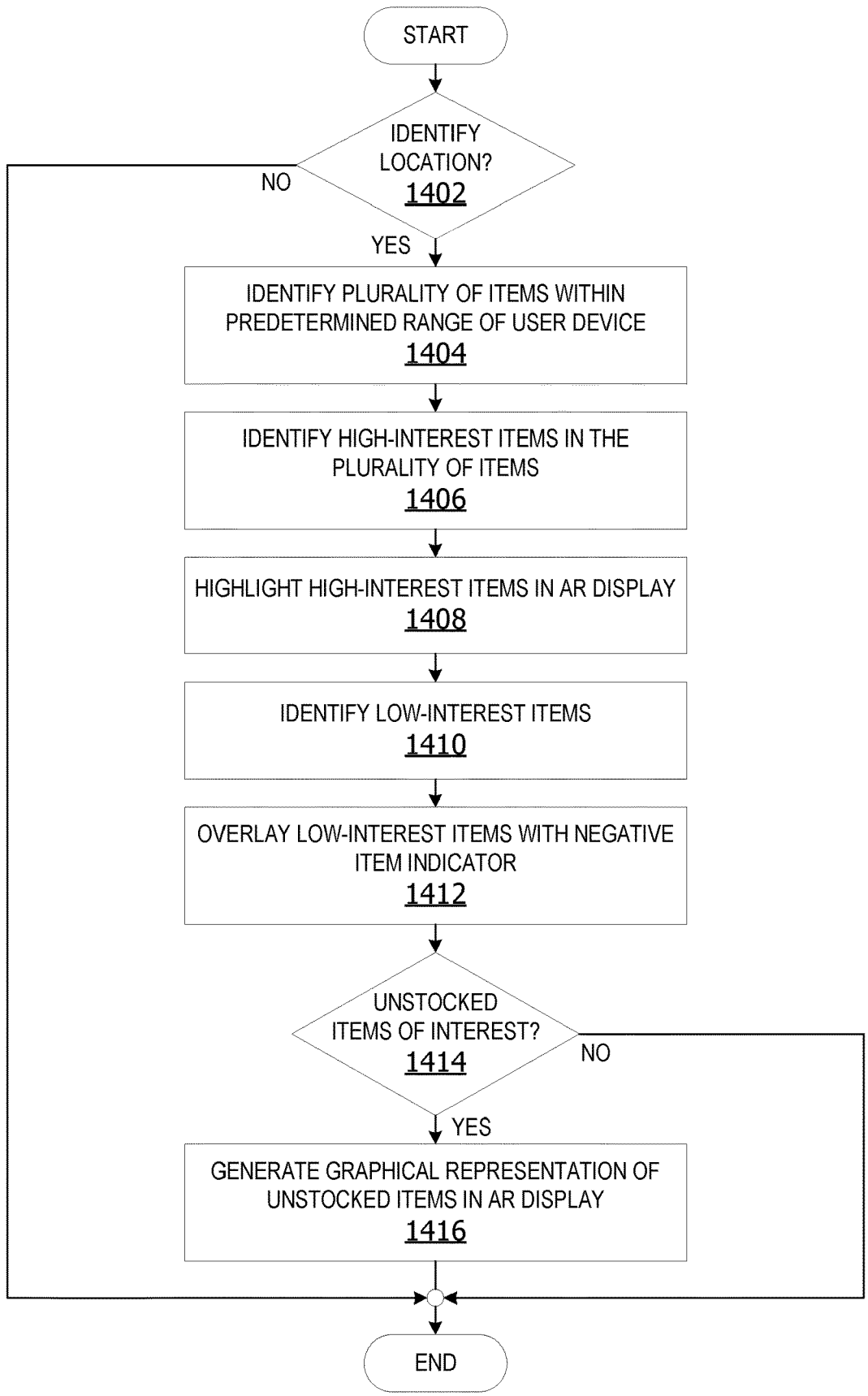
FIG. 14 is an exemplary flow chart illustrating operation of the computing device to generate a graphical representation of un-stocked items in an AR display.

FIG. 14 is an exemplary flow chart illustrating operation of the computing device to generate a graphical representation of un-stocked items in an AR display. The process shown in FIG. 14 can be performed by a customized AR filter component 126, executing on a computing device, such as the computing device 102 or the user device 116 in FIG. 1.

The process begins by determining whether a location of a user device is identified at 1402. The user device includes any type of computing device including an AR generator, such as, but not limited to, the user device 116 in FIG. 1, the user device 202 in FIG. 2, and/or the user device 204 in FIG. 2. The location of the user device can be determined based on an analysis of sensor data generated by sensor devices associated with the user device and/or the item selection area.

If yes, the customized AR filter component identifies a plurality of items within a predetermined range of user device at 1404. The predetermined range is a distance or zone associated with the user device, such as, but not limited to, the predetermined distance 652 in FIG. 6.

The customized AR filter component identifies high-interest items in the plurality of items at 1406. The customized AR filter component highlights high-interest items in an AR display at 1408. The customized AR filter component identifies low-interest items at 1410. The customized AR filter component overlays low-interest with items with negative item indicators at 1412. The customized AR filter component determines if any un-stocked items of interest at 1414. If no, the process terminates thereafter.

Returning to 1414, if there are un-stocked items predicted to be of interest to the user, the customized AR filter component generates a graphical representation of the un-stocked items in AR display at 1416. The process terminates thereafter.

While the operations illustrated in FIG. 14 are performed by a computing device, aspects of the disclosure contemplate performance of the operations by other entities. In some examples, a cloud service performs one or more of the operations.

Figure 15:
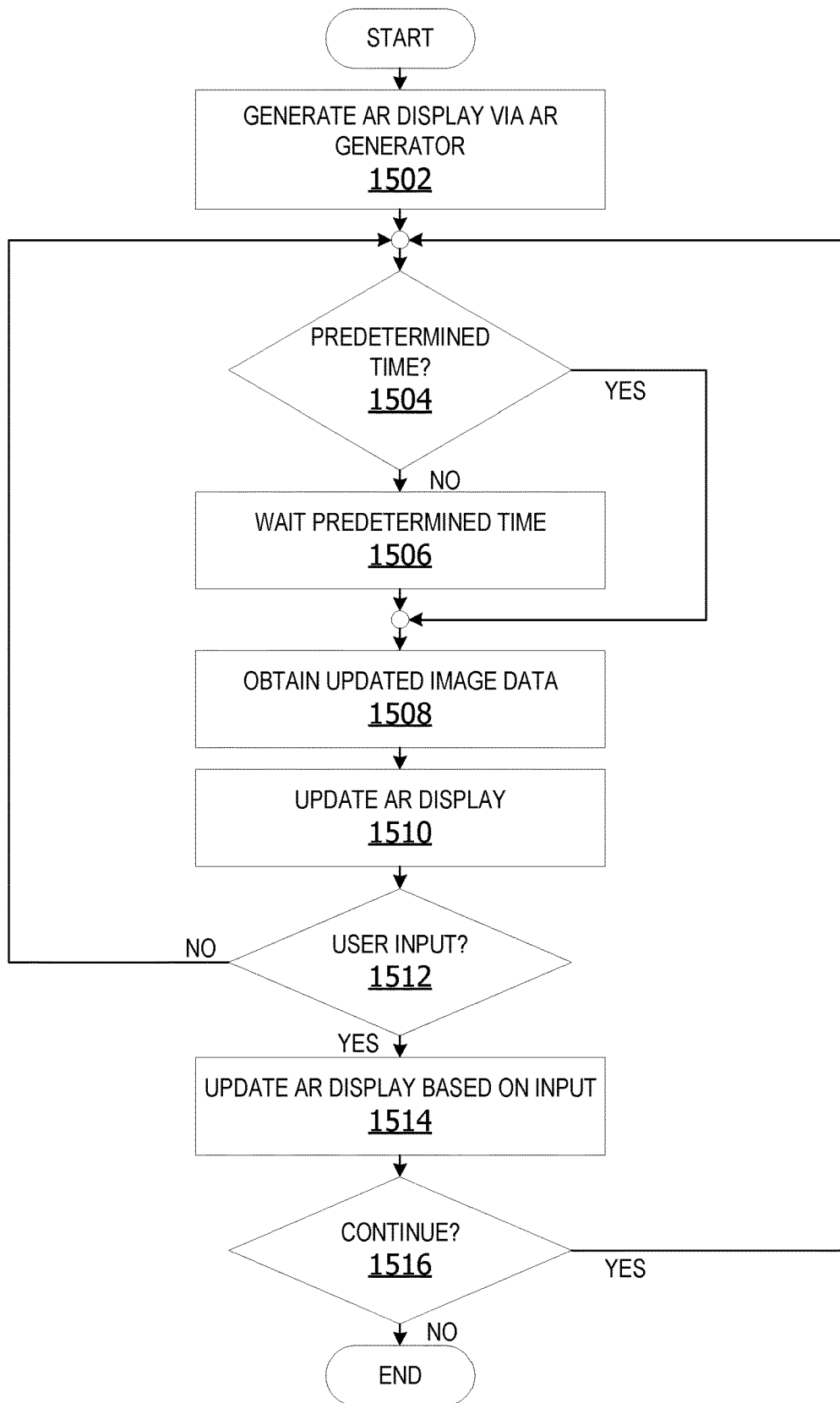
FIG. 15 is an exemplary flow chart illustrating operation of the computing device to update an AR display in real-time.

FIG. 15 is an exemplary flow chart illustrating operation of the computing device to update an AR display in real-time. The process shown in FIG. 15 can be performed by a customized AR filter component, executing on a computing device, such as the computing device 102 or the user device 116 in FIG. 1.

The process begins by generating an AR display via an AR generator at 1502. The customized AR filter component determines whether a predetermined time has passed at 1504, such as the customized AR filter component 126 in FIG. 1, FIG. 6 and FIG. 9. If no, the customized AR filter component waits until the predetermined time is passed at 1506. The customized AR filter component obtains updated image data at 1508. The updated image data is obtained from sensor devices, such as the one or more image capture device(s) 1102 in FIG. 11. The customized AR filter component updates the AR display at 1510. The customized AR filter component determines if user input is received at 1512. The user input can include input such as, but not limited to, the user input 634 in FIG. 6.

If user input is not received, the process returns to 1504. The process iteratively executes operations 1504 through 1512 until user input is received at 1512. If user input is received at 1512, the customized AR filter component updates the AR display based on the user input at 1514. In some examples, the AR display is updated at a predetermined time interval, such as, but without limitation, the predetermined time interval 650 in FIG. 6.

In other examples, the AR display is updated/reset from anywhere within the item selection area. In other words, as the user moves around throughout the item selection area, the AR display is updated to reflect the changing FOV of the user/user device.

The customized AR filter component determines whether to continue at 1516. If yes, the process returns to 1504 and iteratively executes operations 1504 through 1516 until a determination is made not to continue. In some examples, the determination not to continue is made when the user exits the item selection area and/or completes a transaction associated with at least one item. The process terminates thereafter.

While the operations illustrated in FIG. 15 are performed by a computing device, aspects of the disclosure contemplate performance of the operations by other entities. In some examples, a cloud service performs one or more of the operations.

Figure 16:
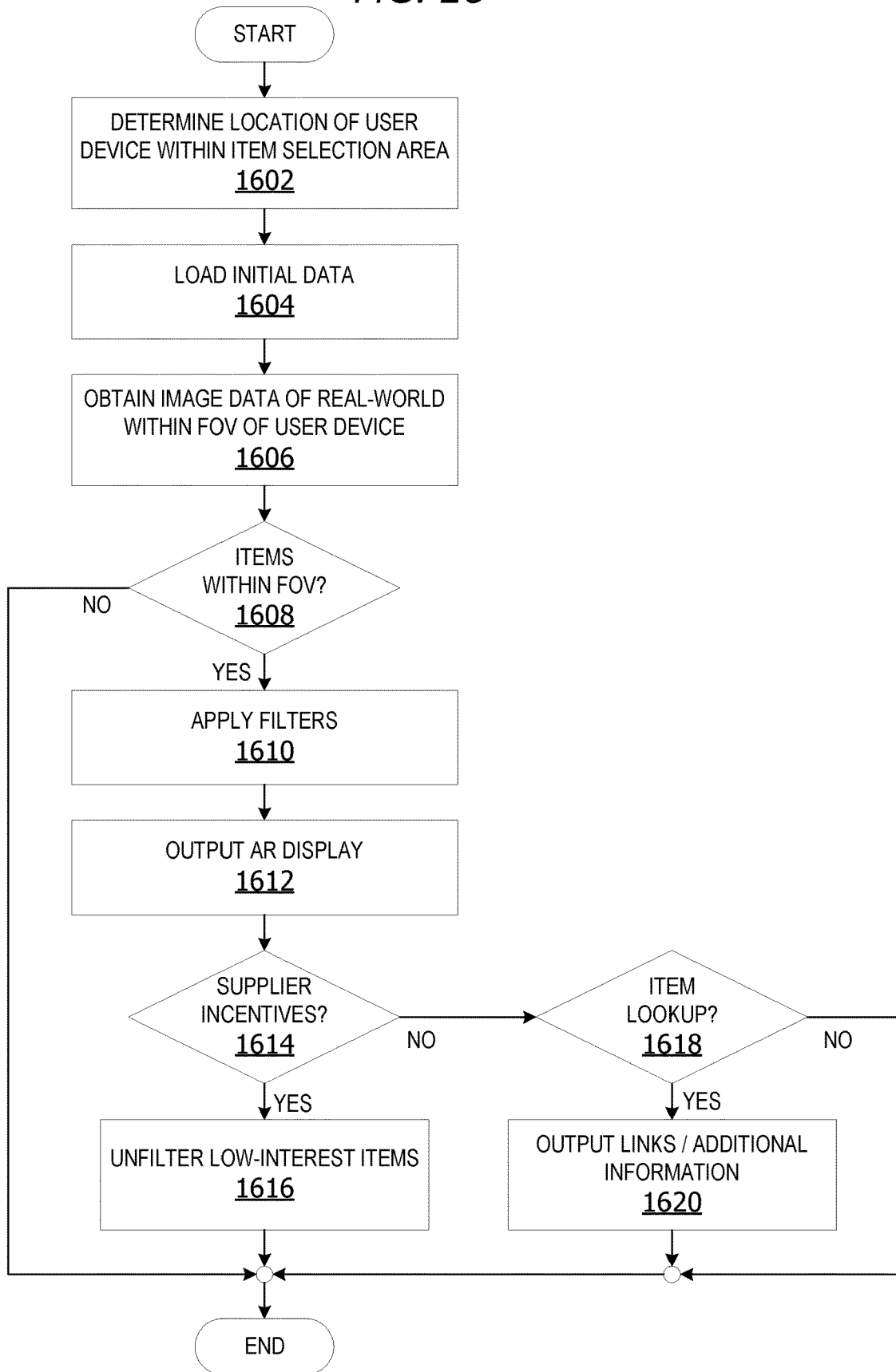
FIG. 16 is an exemplary flow chart illustrating operation of the computing device to apply customized item filters via AR.

FIG. 16 is an exemplary flow chart illustrating operation of the computing device to apply customized item filters via AR. The process shown in FIG. 16 can be performed by a customized AR filter component, executing on a computing device, such as the computing device 102 or the user device 116 in FIG. 1.

The customized AR filter component determines a location of a user device within an item selection area at 1602. The customized AR filter component loads initial data at 1604. The initial data can include item image data, item markers, item data, aisle location data, planogram data, item selection criteria, etc.

The customized AR filter component obtains image data of real-world within the FOV of the user device at 1606. The customized AR filter component determines whether there are any items within the FOV of the user device at 1608. If there are no items within the FOV of the user device, the process terminates thereafter.

If there are any items within the FOV of the user device at 1608, the customized AR filter component applies the applicable item filters at 1610. The customized AR filter component outputs the AR display at 1612. The customized AR filter component determines if there are any supplier incentives at 1614. Incentives can include promotions customized/specific to the user, such as, but not limited to, the promotional offer 906 in FIG. 9. If yes, the customized AR filter component un-filters any low-interest items associated with the supplier incentives at 1616. The process terminates thereafter.

If there are no supplier incentives at 1614, the customized AR filter component determines if there is a user lookup at 1618. The user lookup is a request for additional information from the user, such as, but not limited to, the user input 634 in FIG. 6. If no, the process terminates thereafter.

Returning to 1618, if the customized AR filter component receives an item lookup, the customized AR filter component outputs links and/or other additional information at 1620. The information is information associated with one or more high-interest items, such as, but not limited to, the additional information 632 in FIG. 6. The process terminates thereafter.

While the operations illustrated in FIG. 16 are performed by a computing device, aspects of the disclosure contemplate performance of the operations by other entities. In some examples, a cloud service performs one or more of the operations.

Additional Examples

In some examples, as a user walks down an aisle in an item selection area, the customized AR filter component determines a location of the user device and applies selection criteria/applicable filters to highlight items of interest, obscure low-interest items, and/or generate graphical representations of out-of-stock high-interest items available for restock or order. The user can select items for order by touching a screen on the user device, gesturing, speaking a voice command/request, touching a three-dimensional item on the scree/in the AR display, touching a real-world item, reaching for an item, clicking on an item, or providing another user input. This enables an individual (customer or associate) to use AR to highlight or only show, items that have certain qualities desired by the individual. In some examples, the system filters for new items, items with certain ingredients, items that achieve a specific purpose, etc.

In an exemplary illustration, a user opens the filter application on a user device as the user enters a store. A customized AR filter component on a server or other computing device receives sensor data from the user device to determine a location of the user. The customized AR filter component identifies a plurality of items assigned to the area within a predetermined range of the user. The customized AR filter component obtains the user's selection criteria/search terms and item data, including item attributes for the user. The customized AR filter component obtains image data from the user device. The image data is analyzes using image recognition to identify items in the FOV of the user or user device to determine which items the user is looking at using markers/item recognition, etc. The customized AR filter component performs filtering on the items in the FOV to identify high-interest and low-interest items within the FOV as well as items outside the FOV/un-stocked items which can also be high-interest based on the type/category and filter criteria. Low-interest items are greyed out or obscured. If the user provides additional input, such as providing verbal queries, reaching for items, touching a graphical representation of an item on a screen, or other user input, the system responds to the user input. The response can include fine-tuning the search/filter results, outputting additional information, providing ordering information, outputting a link to another website, etc.

In another example, the AR system filtering products includes sensor device(s) that capture image data of items in real-time. The system utilizes AR technique to obtain image data. The system considers user preferences, user input entered by user in real-time and/or filter criteria. The system utilizes the user data and image data to filter the products according to user preference/requirements. The system utilizes AR to highlight/show the filtered products according to the filtered criteria of user.

The system in one example filters for brand line products in same feature set groups of products a user can purchase/ use together. The brand-line products include items in the same line of items, same brand, and/or same grouping. The system can also filter for items associated together but not same brand. For example, high-definition multimedia interface (HDMI) cable with a television.

In another example, feedback includes item feedback for item repurchases. If a user purchases the same item or type of item two or more items, the system can output a feedback request to the user. The user can be provided with a reward/incentive for providing the feedback.

Cryptocurrency can be accepted in some examples to complete a transaction associated with ordering an un-stocked virtual item (ghost product). The system can provide additional purchase options, such as discounts/rewards if the user removes/rejects certain options, such as return and exchange options. In another example, the system provides/ offers the user with a lower price/reduced shipping costs if the user opts to group an item with other ordered items and/or agrees to pick-up an item at a store instead of delivery of the item to the user's residence. If the user opts out, the system can offer/provide the user with a discount/reduced purchase price for the item. These transactions ordering items and/or purchasing items via online methods, can be performed in the store at the shelf.

The un-stocked virtual items filtered for the user can include items provided by local businesses/online marketplace via different retailers specific to the item selection area's geographic region. If the user orders these un-stocked items, the user can opt to pick-up the items at the item selection area at a later item.

In an illustrative example, a user rearranges an augmented reality image of the modular display to suit their preferences. The user can select a graphical representation associated with an item in the AR display and move the item to a different location within the AR display to alter the arrangement of items to suit the user's personal preference. The change to the display can be a one-time only change or a permanent change/new default arrangement for the items in the selected user's preferences. In other words, the changes the user makes to the arrangement of graphical representations of items in the AR display become the new default arrangement customized for that user.

In other examples, the user can alter the AR display to suit the user's preferences by changing color of one or more shelves, adding virtual signage, adding a graphical character, or other graphical designs to the AR display. For example, a user can alter the AR display to include a graphical unicorn character which moves throughout the AR display. In another example, a user can alter the AR display to include graphical images of birds, squirrels, cats, or other animals moving throughout the AR display. Another user can alter the AR display to add a flower pattern to shelfs, change color of walls or floors, etc.

The system in some examples outputs a query to the user regarding the user's current location within an item selection area. For example, the filter application can output a list of item areas, such as, dairy area, toy department, sports equipment, pet care area, etc. The user selects the area of the store where the user is currently located. The user device sends the selected area to the filter component. The filter component utilizes the user-designated area to begin identifying items within the predetermined range of the user (FOV of the user) and apply selection criteria to those items for AR filtering.

The system can also output content to electronic/digital signs. The content can include product images, price data, item information, etc. This can be useful where the user device is a cell phone or other user device having a small screen. Syncing the AR display content data with the electronic/digital output device (display screen on shelves), enables easier viewing of content by user. The content can be sent through firewall webservice to the digital output device to change the electronic sign.

Alternatively, or in addition to the other examples described herein, examples include any combination of the following:

a set of virtual signs within the AR display, the set of virtual signs comprising information associated with at least one item in the set of high-interest items or at least one item in the set of un-stocked virtual items;

an un-stocked virtual items manager, implemented on the at least one processor, wherein the graphical representation of each item in the set of un-stocked virtual items comprises a status indicator;

wherein the status indicator comprises at least one of an alternate location indicator associated with items currently available in another display at a different location within the item selection area;

a re-stock indicator associated with items available in current inventory for re-stocking an empty item display upon request;

an order indicator associated with items available for order from a remote location for pick-up by the user or delivery to the user at a future date;

a pop-up generator, implemented on the at least one processor, that outputs additional information associated with at least one item in the set of high-interest items within the AR display in response to receiving a user input associated with the at least one item, the additional information comprising at least one or item data, online purchase information, or a link to a website associated with at least one item;

a feedback component, implemented on the at least one processor, that outputs a request for feedback associated with an arrangement of items within the AR display or feedback associated with an item within the AR display selected for purchase by the user;

a promotions component, implemented on the at least one processor, that receives at least one promotional offer associated with an item in the set of low-interest items from a remote computing device associated with a supplier in real-time;

wherein the filter component further analyzes the promotional offer using the set of weighted selection criteria and the set of user preferences to determine whether to move the item from the set of low-interest items to the set of high-interest items;

wherein the filter component moves the promotional item from the set of low-interest items to the set of high-interest items on condition the set of weighted selection criteria and the set of user preferences indicates the promotional offer increases potential interest of the user in the promotional item;

an item status update received from the filter component, by the overlay update component, identifying the promotional item as a high-interest item;

wherein the AR generator generates an updated AR display in real-time;

wherein the updated AR display comprises a positive item indicator associated with the item, wherein the negative item indicator associated with the promotional item is removed from the updated AR display;

a virtual shelf within the AR display, the virtual shelf comprising at least one graphical representation of at least one un-stocked virtual item predicted to be of interest to the user based on user-provided data and historical transaction data associated with the user;

a re-stock control associated with an item in the set of un-stocked items, wherein a notification is sent to an associate to re-stock an item in response to a user selection of the re-stock control in response to a determination at least one instance of the item in the set of un-stocked items is available in a storage area;

an item-order request control associated with an item in the set of un-stocked items, wherein an order component orders the un-stocked item for pick-up by the user or delivery to an address provided by the user in response to user selection of the item-order request control and completion of an item order;

a streaming content display node within the AR display, the streaming content associated with at least one item in the set of high-interest items or at least one user preference within a set of user AR display preferences;

receiving, by a promotions component, a promotional offer associated with at least one item in the set of low-interest items;

analyzing, by a filter component, the promotional offer using a set of per-user selection criteria;

on condition the filter component determines the at least one item is of potential interest to the user based on the analysis of the promotion offer, dynamically removing, by the AR generator, a negative item indicator associated with the at least one item;

outputting the updated AR display to the user, the updated AR display comprising at least one positive item indicator associated with the at least one item;

analyzing, by a feedback component, feedback associated with the set of high-interest items;

updating the set of per-user selection criteria based on the analysis of the feedback;

sending a notification to a restock manager requesting re-stock of a selected un-stocked virtual item in response to user selection of a re-stock button associated with the selected un-stocked item within the AR display;

outputting an order request to the user on condition the user activates an item-order request control within the AR display via a user interface associated with the user device, wherein a completed order request is transmitted to a remote computing device by the user device to place an order requesting an un-stocked item be delivered to an address provided by the user or picked-up by the user at a predetermined time;

modifying contents of the AR display in response to receiving user input altering at least one graphical element within the AR display, wherein modifying the content of the AR display comprises modifying an arrangement of at least one item within the AR display or altering an appearance of at least one item within the AR display;

identifying a digital output device within a predetermined distance of the user device, the digital output device attached to a physical set of shelves associated with the plurality of items;

transmitting customized content from the user device to the digital output device for display to the user, wherein the customized content comprises information associated with at least one item in the set of high-interest items or at least one item in the set of un-stocked virtual items;

analyzing item data using a set of weighted selection criteria and the set of user preferences to identify a high-interest category of items associated with the user, wherein the AR display comprises a positive category indicator associated with all items in the high-interest category within the FOV of the user;

analyzing item data using a set of weighted selection criteria and the set of user preferences to identify a low-interest category of items associated with the user, wherein the AR display comprises a negative category indicator associated with all items in the low-interest category within the FOV of the user;

receiving a selection of an item within the AR display;

identifying a set of related items, wherein the set of related items comprises at least one of an item in a same brand-line as the selected item or at least one item associated with the selected item;

updating the AR display to include a graphical representation of the set of related items;

a prediction component, implemented on the at least one processor, that identifies a set of un-stocked items physically absent from the predetermined range of the user of potential interest to the user, wherein the AR display comprises a graphical representation of each item in the set of un-stocked items within a virtual item display; and an un-stocked items status indicator comprising at least one of an alternate location indicator associated with items currently available in another display at a different location within the item selection area;

a re-stock indicator associated with items available in current inventory for re-stocking an empty item display upon request; and/or an order indicator associated with items available for order from a remote location for pick-up by the user or delivery to the user at a future date.

At least a portion of the functionality of the various elements in FIG. 1, FIG. 2, FIG. 3, FIG. 4, FIG. 5, FIG. 6, FIG. 7, FIG. 8, FIG. 9, FIG. 10, FIG. 11, and FIG. 12 can be performed by other elements in FIG. 1, FIG. 2, FIG. 3, FIG. 4, FIG. 5, FIG. 6, FIG. 7, FIG. 8, FIG. 9, FIG. 10, FIG. 11, and FIG. 12, or an entity (e.g., processor 106, web service, server, application program, computing device, etc.) not shown in FIG. 1, FIG. 2, FIG. 3, FIG. 4, FIG. 5, FIG. 6, FIG. 7, FIG. 8, FIG. 9, FIG. 10, FIG. 11, and FIG. 12.

In some examples, the operations illustrated in FIG. 13, FIG. 14, FIG. 15 and FIG. 16 can be implemented as software instructions encoded on a computer readable medium, in hardware programmed or designed to perform the operations, or both. For example, aspects of the disclosure can be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

While no personally identifiable information is tracked by aspects of the disclosure, examples have been described with reference to data monitored and/or collected from the users. In some examples, notice can be provided to the users of the collection of the data (e.g., via a dialog box or preference setting) and users are given the opportunity to give or deny consent for the monitoring and/or collection. The consent can take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement particular abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for customized AR item filtering. For example, the elements illustrated in FIG. 1, FIG. 2, FIG. 3, FIG. 4, FIG. 5, FIG. 6, FIG. 7, FIG. 8, FIG. 9, FIG. 10, FIG. 11, and FIG. 12, such as when encoded to perform the operations illustrated in FIG. 13, FIG. 14, FIG. 15 and FIG. 16, constitute exemplary means for identifying a location of a user device associated with a user and a plurality of items within a predetermined distance of the user device based on the identified location and a site-specific planogram; exemplary means for identifying a set of high-interest items and a set of low-interest items from the plurality of items; exemplary means for identifying a set of un-stocked items of potential interest to the user, each item in the set of un-stocked items is physically absent from a set of displays within the FOV of the user; exemplary means for assigning a positive item indicator to each item in a set of high-interest items, a negative item indicator for each item in the set of low-interest items, and a graphical representation for each item in the set of un-stocked items; and exemplary means for generating an AR display of a portion of an item selection area within a FOV of the user to the user device for display to the user.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. An augmented reality system for filtering items in real-time, the system comprising:
   a memory;
   at least one processor communicatively coupled to the memory;
   a set of sensor devices generating sensor data associated with a plurality of items within a field of view (FOV) of a user device associated with a user in an item selection area;
   an item filter component, implemented on the at least one processor, that analyzes item data associated with the plurality of items and the sensor data using a set of weighted selection criteria and a set of user preferences to select a set of high-interest items and a set of low-interest items for the user, the set of high-interest items comprising a set of items physically available within the FOV of the user device and a set of items physically absent from the FOV of the user device;
   a promotions component, implemented on the at least one processor, that receives a promotional offer associated with a first item in the set of low-interest items from a remote computing device associated with a supplier in real-time, wherein the filter component further analyzes the promotional offer using the set of weighted selection criteria and the set of user preferences to determine whether to move the item from the set of low-interest items to the set of high-interest items, wherein the filter component moves the first item from the set of low-interest items to the set of high-interest items on condition the set of weighted selection criteria and the set of user preferences indicates the promotional offer increases potential interest of the user in the item;
   an overlay component, implemented on the at least one processor, that assigns a positive item indicator to each item in the set of high-interest items and a negative item indicator for each item in the set of low-interest items; and
   an augmented reality (AR) generator, implemented on the at least one processor, that outputs an AR display of the FOV of the user device, the AR display comprising a real-world image of a portion of the item selection area within the FOV of the user and an AR overlay, the AR overlay comprising a set of positive item indicators associated with each item in the set of high-interest items and a set of negative item indicators associated with each item in the set of low-interest items, and a virtual display comprising a set of un-stocked virtual items physically absent from the FOV of the user device.

2. The system of claim 1, further comprising:
   a set of virtual signs within the AR display, the set of virtual signs comprising information associated with at least one item in the set of high-interest items or at least one item in the set of un-stocked virtual items.

3. The system of claim 1, further comprising:
   an un-stocked virtual items manager, implemented on the at least one processor, wherein a graphical representation of each item in the set of un-stocked virtual items comprises a status indicator, wherein the status indicator comprises at least one of an alternate location indicator associated with items currently available in another display at a different location within the item selection area, a re-stock indicator associated with items available in current inventory for re-stocking an empty item display upon request, and an order indicator associated with items available for order from a remote location for pick-up by the user or delivery to the user at a future date.

4. The system of claim 1, further comprising:
   a pop-up generator, implemented on the at least one processor, that outputs additional information associated with at least one item in the set of high-interest items within the AR display in response to receiving a user input associated with the at least one item, the additional information comprising at least one of online order information or a link to a website associated with at least one item.

5. The system of claim 1, further comprising:
   a feedback component, implemented on the at least one processor, that outputs a request for feedback associated with an arrangement of items within the AR display or feedback associated with an item within the AR display selected for purchase by the user.

6. The system of claim 1, further comprising:
   a second item in the set of low-interest items, wherein the item filter component analyzes a promotional offer associated with the second item using a set of per-user selection criteria;
   the AR generator dynamically removes a negative item indicator associated with the second item on condition the filter component determines the second item is of potential interest to the user based on the analysis of the promotional offer; and
   an updated AR display output to the user, the updated AR display comprising at least one positive item indicator associated with the second item.

7. The system of claim 1, further comprising:
   an item status update received from the filter component, by the overlay update component, identifying the first item as a high-interest item, wherein the AR generator generates an updated AR display in real-time, and wherein the updated AR display comprises a positive item indicator associated with the item, wherein the negative item indicator associated with the first item is removed from the updated AR display.

8. The system of claim 1, further comprising:
   a virtual shelf associated with the virtual display within the AR display, the virtual shelf comprising at least one graphical representation of at least one un-stocked item predicted to be of interest to the user based on user-provided data and historical transaction data associated with the user.

9. The system of claim 1, wherein the AR display further comprises:
   a re-stock control associated with an un-stocked item, wherein a notification is sent to an associate to re-stock an item in response to a user selection of the re-stock control in response to a determination at least one instance of the un-stocked item is available in a storage area; and
   an item-order request control associated with the un-stocked item, wherein an order component places un-stocked item on order for pick-up by the user or delivery to an address provided by the user in response to the user selection of the item-order request control and completion of an item order request form.

10. The system of claim 1, wherein the AR display further comprises:
    a streaming content display node providing streaming content within the AR display, the streaming content associated with at least one item in the set of high-interest items or at least one user preference within the set of user preferences.

11. A computer-implemented method for augmented reality item filtering in real-time, the method comprising:
generating, by a set of sensor devices, sensor data associated with a plurality of items within a field of view (FOV) of a user device associated with a user in an item selection area;
analyzing, by an item filter component, item data associated with the plurality of items and the sensor data using a set of weighted selection criteria and a set of user preferences to select a set of high-interest items and a set of low-interest items for the user, the set of high-interest items comprising a set of items physically available within the FOV of the user device and a set of items physically absent from the FOV of the user device;
receiving, by a promotions component, a promotional offer associated with a first item in the set of low-interest items from a remote computing device associated with a supplier in real-time, wherein the filter component further analyzes the promotional offer using the set of weighted selection criteria and the set of user preferences to determine whether to move the item from the set of low-interest items to the set of high-interest items, wherein the filter component moves the first item from the set of low-interest items to the set of high-interest items on condition the set of weighted selection criteria and the set of user preferences indicates the promotional offer increases potential interest of the user in the item;
assigning, by an overlay component, a positive item indicator to each item in the set of high-interest items and a negative item indicator for each item in the set of low-interest items; and
outputting, by an augmented reality (AR) generator, an AR display of the FOV of the user device, the AR display comprising a real-world image of a portion of the item selection area within the FOV of the user and an AR overlay, the AR overlay comprising a set of positive item indicators associated with each item in the set of high-interest items and a set of negative item indicators associated with each item in the set of low-interest items, and a virtual display comprising a set of un-stocked virtual items physically absent from the FOV of the user device.

12. The method of claim 11, further comprising:
responsive to moving a second item from the set of low-interest items to the set of high-interest items, dynamically removing at least one negative item indicator associated with the first item; and
outputting an updated AR display to the user, the updated AR display comprising at least one positive item indicator associated with the second item.

13. The method of claim 11, further comprising:
analyzing, by a feedback component, feedback associated with the set of high-interest items; and
updating the set of per-user selection criteria based on the analysis of the feedback.

14. The method of claim 11, further comprising:
sending a notification to a restock manager requesting re-stock of a selected un-stocked virtual item in response to user selection of a re-stock button associated with the selected un-stocked item within the AR display.

15. The method of claim 14, further comprising:
outputting an order request to the user on condition the user activates an item-order request control within the AR display via a user interface associated with the user device, wherein a completed order request is transmitted to a remote computing device by the user device to place an order requesting an un-stocked item be delivered to an address provided by the user or picked-up by the user at a predetermined time.

16. The method of claim 15, further comprising:
modifying contents of the AR display in response to receiving user input altering at least one graphical element within the AR display, wherein modifying the content of the AR display comprises modifying an arrangement of at least one item within the AR display or altering an appearance of at least one item within the AR display.

17. The method of claim 11, further comprising:
identifying a digital output device within the predetermined distance of the user device, the digital output device attached to a physical set of shelves associated with the plurality of items; and
transmitting customized content from the user device to the digital output device for display to the user, wherein the customized content comprises information associated with at least one item in the set of high-interest items or at least one item in a set of un-stocked virtual items.

18. The method of claim 11, further comprising:
analyzing item data using a set of weighted selection criteria and a set of user preferences to identify a high-interest category of items associated with the user, wherein the AR display comprises a positive category indicator associated with all items in the high-interest category within the FOV of the user device; and
analyzing the item data using the set of weighted selection criteria and the set of user preferences to identify a low-interest category of items associated with the user, wherein the AR display comprises a negative category indicator associated with all items in the low-interest category within the FOV of the user device.

19. The method of claim 11, further comprising:
receiving a selection of an item within the AR display;
identifying a set of related items, wherein the set of related items comprises at least one of an item in a same brand-line as the selected item or at least one item associated with the selected item; and
updating the AR display to include the graphical representation of the set of related items within the AR display.

20. One or more computer storage devices, having computer-executable instructions for augmented reality item filtering in real-time, that, when executed by a computer cause the computer to perform operations comprising:
generating, by a set of sensor devices, sensor data associated with a plurality of items within a field of view (FOV) of a user device associated with a user in an item selection area;
analyzing, by an item filter component, item data associated with the plurality of items and the sensor data using a set of weighted selection criteria and a set of user preferences to select a set of high-interest items and a set of low-interest items for the user, the set of high-interest items comprising a set of items physically available within the FOV of the user device and a set of items physically absent from the FOV of the user device;

receiving, by a promotions component, a promotional offer associated with a first item in the set of low-interest items from a remote computing device associated with a supplier in real-time, wherein the filter component further analyzes the promotional offer using the set of weighted selection criteria and the set of user preferences to determine whether to move the item from the set of low-interest items to the set of high-interest items, wherein the filter component moves the first item from the set of low-interest items to the set of high-interest items on condition the set of weighted selection criteria and the set of user preferences indicates the promotional offer increases potential interest of the user in the item;

assigning, by an overlay component, a positive item indicator to each item in the set of high-interest items and a negative item indicator for each item in the set of low-interest items; and outputting, by an augmented reality (AR) generator, an AR display of the FOV of the user device, the AR display comprising a real-world image of a portion of the item selection area within the FOV of the user and an AR overlay, the AR overlay comprising a set of positive item indicators associated with each item in the set of high-interest items and a set of negative item indicators associated with each item in the set of low-interest items, and a virtual display comprising a set of un-stocked virtual items physically absent from the FOV of the user device.

* * * * *